United States Patent
Tse

(10) Patent No.: US 10,216,977 B2
(45) Date of Patent: Feb. 26, 2019

(54) PROGRESSIVE MULTIPLE FINGERPRINT ENROLLMENT AND MATCHING, AND DYNAMIC USER ACCOUNT TRANSITIONS

(71) Applicant: QUALCOMM Incorporated, San Diego, CA (US)

(72) Inventor: Justin Tse, Poway, CA (US)

(73) Assignee: QUALCOMM Incorporated, San Diego, CA (US)

(*) Notice: Subject to any disclaimer, the term of this patent is extended or adjusted under 35 U.S.C. 154(b) by 35 days.

(21) Appl. No.: 15/400,871

(22) Filed: Jan. 6, 2017

(65) Prior Publication Data
US 2018/0196988 A1    Jul. 12, 2018

(51) Int. Cl.
| | |
|---|---|
| *G06K 9/00* | (2006.01) |
| *G06T 9/20* | (2006.01) |
| *G06F 21/32* | (2013.01) |
| *G06F 3/041* | (2006.01) |

(52) U.S. Cl.
CPC ......... *G06K 9/00087* (2013.01); *G06F 21/32* (2013.01); *G06K 9/00013* (2013.01); *G06K 9/00926* (2013.01)

(58) Field of Classification Search
CPC .. G06F 21/32; G06F 2203/0338; G06F 3/041; G06F 3/0416
USPC ................ 382/115, 116, 124, 209, 218, 278; 340/5.81, 5.82, 5.83
See application file for complete search history.

(56) References Cited

U.S. PATENT DOCUMENTS

| | | | | |
|---|---|---|---|---|
| 6,795,569 B1* | 9/2004 | Setlak | ................ | G06K 9/00006 382/124 |
| 7,236,617 B1* | 6/2007 | Yau | .................... | G06K 9/00026 382/125 |
| 7,454,624 B2* | 11/2008 | LaCous | .................. | G06F 21/32 713/186 |

(Continued)

FOREIGN PATENT DOCUMENTS

KR    101054993    8/2011

OTHER PUBLICATIONS

Nagalakshmi G., et al., "Automatic Detection of Enrolled Distorted Fingerprints", International Journal of Computer Applications (0975-8887), vol. 147, No. 3, Aug. 2016, pp. 19-24.

*Primary Examiner* — Yosef Kassa
(74) *Attorney, Agent, or Firm* — Weaver Austin Villeneuve & Sampson LLP

(57) ABSTRACT

An apparatus may include a fingerprint sensor system and a control system. The control system may be configured for receiving fingerprint sensor data from the fingerprint sensor system and for extracting fingerprint data from the fingerprint sensor data. The fingerprint data may correspond to fingerprints of multiple digits of a user's hand. The control system may be configured for providing a progressive enrollment process for the fingerprint data. The progressive enrollment process may involve storing at least some of the fingerprint data and augmenting stored fingerprint data as the user continues to use the apparatus. The progressive enrollment process may involve processing first fingerprint data corresponding to a first digit of the user's hand during a processing time for second fingerprint data corresponding to a second digit of the user's hand. At least a portion of the progressive enrollment process may be performed without user prompts.

22 Claims, 20 Drawing Sheets

(56) References Cited

U.S. PATENT DOCUMENTS

| | | | | |
|---|---|---|---|---|
| 7,574,002 B2* | 8/2009 | Karan | ................. | H04M 1/0235 |
| | | | | 379/433.07 |
| 7,574,022 B2* | 8/2009 | Russo | ................ | G06K 9/00026 |
| | | | | 382/124 |
| 7,627,151 B2* | 12/2009 | Rowe | ................ | G06K 9/00013 |
| | | | | 340/5.53 |
| 7,912,256 B2* | 3/2011 | Russo | ................ | G06K 9/00026 |
| | | | | 382/124 |
| 8,073,204 B2* | 12/2011 | Kramer | ............. | G06K 9/00013 |
| | | | | 250/208.1 |
| 8,605,960 B2* | 12/2013 | Orsley | ................. | G06F 3/0421 |
| | | | | 382/124 |
| 8,810,367 B2* | 8/2014 | Mullins | .................. | G06F 21/32 |
| | | | | 340/5.53 |
| 8,823,489 B2* | 9/2014 | Liu | ........................ | G06F 21/32 |
| | | | | 340/5.4 |
| 2005/0134427 A1 | 6/2005 | Hekimian | | |
| 2016/0055825 A1 | 2/2016 | Lee | | |
| 2016/0239701 A1 | 8/2016 | Lee et al. | | |

\* cited by examiner

| Account 1 Print Data Matrix | Account 2 Print Data Matrix | Account 3 Print Data Matrix |
|---|---|---|
| FP "1A" (Left Thumb) | FP "2A" (Right Pinky) | FP "3A" (Person 1, Right Pinky) |
| FP "1B" (Left Pinky) | FP "2B" (Right Ring) | FP "3B" (Person 1, Right Ring) |
| FP "1C" (Right Pointing for purchase) | FP "2C" (Right Middle) | FP "3C" (Person 2, Right Pointing) |
| FP "1D" (Left Ring) | FP "2D" (Right Pointing) ←Referenced | FP "3D" (Person 3, Right Thumb) |
| FP "1E" (Left Middle) | FP "2E" (Right Thumb) | FP "2E" (Person 3, Right Middle) |
| FP "1F" (Left Pointing) | FP "1F" (Left Pointing for purchase) | |

*FIGURE 7*

Limited FP Available
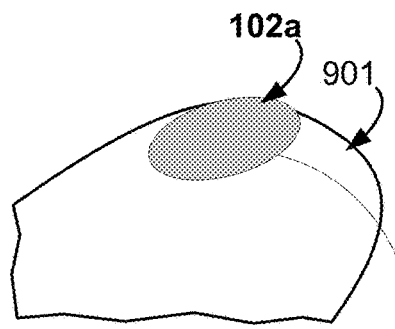
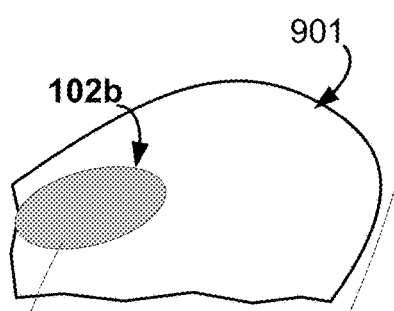
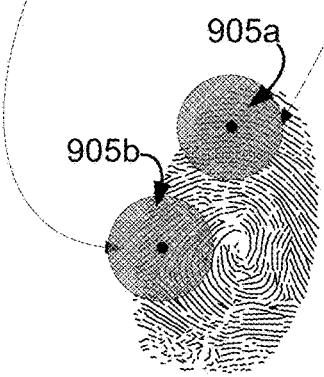
FIGURE 9A
Limited Sensor Available
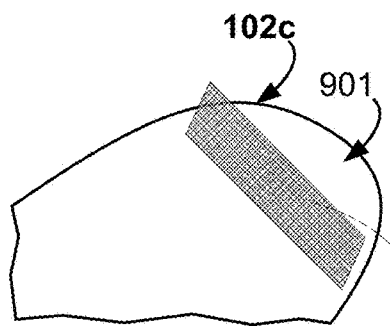
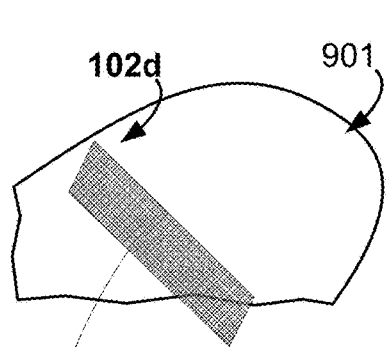
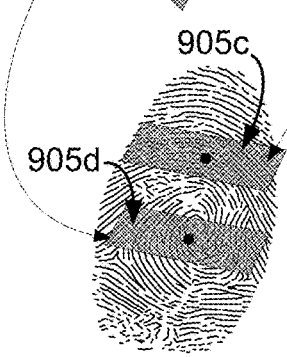
FIGURE 9B

PROGRESSIVE MULTIPLE FINGERPRINT ENROLLMENT AND MATCHING, AND DYNAMIC USER ACCOUNT TRANSITIONS

TECHNICAL FIELD

This disclosure relates generally to fingerprint sensor systems and methods for using such systems.

DESCRIPTION OF THE RELATED TECHNOLOGY

Many devices, including but not limited to smart phones, use fingerprint authentication as one method of access control. Normally a user needs to go through a time-consuming manual enrollment process, including a series of prompts, before using such a device. After a user has been granted access, an unlocked device may be used by an unauthorized user.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include a fingerprint sensor system and a control system that is configured for communication with the fingerprint sensor system. According to some examples, fingerprint sensors of the fingerprint sensor system are distributed around at least part of a perimeter of the apparatus. In some examples, at least a portion of the control system may be coupled to the fingerprint sensor system. In some implementations, a mobile device may be, or may include, the apparatus. For example, a mobile device may include an apparatus as disclosed herein. According to some such examples, the mobile device may be a smart phone.

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured for receiving fingerprint sensor data from the fingerprint sensor system and for extracting fingerprint data from the fingerprint sensor data. The fingerprint data may, in some examples, correspond to fingerprints of multiple digits of a user's hand.

In some examples, the control system may be configured for providing a progressive enrollment process for the fingerprint data. The progressive enrollment process may involve storing at least some of the fingerprint data and augmenting stored fingerprint data as the user continues to use the apparatus. According to some examples, the progressive enrollment process may involve processing first fingerprint data corresponding to a first digit of the user's hand during a processing time for second fingerprint data corresponding to a second digit of the user's hand.

According to some examples, the control system may be configured for performing at least a portion of the progressive enrollment process without causing the apparatus to provide user prompts. The portion may, for example, be an initial portion of the progressive enrollment process, prior to which no fingerprint data for the user has been enrolled. In some examples, the portion may be a portion of the progressive enrollment process that is performed after enrolling fingerprint data corresponding to at least one digit of the user's hand.

In some implementations, the control system may be configured for enrolling multiple authorized users and creating multiple authorized user accounts. In some examples, each of the authorized user accounts may include data for multiple fingerprints.

According to some implementations, the control system may be configured for automatically making the apparatus transition from a state in which an authorized user is logged out to a state in which the authorized user is logged in, in response to a first contact of the authorized user's digits, without causing the apparatus to provide user prompts. In some implementations, the apparatus includes a display. According to some such implementations, making the transition to the state in which the authorized user is logged in may involve loading an authorized user's desktop configuration and controlling the display to present the authorized user's desktop configuration, loading an authorized user's last application, and/or loading an authorized user's last window viewed and controlling the display to present the authorized user's last window viewed.

In some examples, the control system may be configured for determining that fingerprint data currently being acquired by the fingerprint sensor system corresponds with fingerprints of a first authorized user and fingerprints of a second authorized user. In some such examples, the control system may be configured for invoking account characteristics of the second authorized user without logging out the first authorized user.

In some implementations, the control system may be configured for detecting a first digit in contact with the apparatus. The first digit may, in some examples, have a previously-enrolled first fingerprint. In some examples, the control system may be configured for detecting, while the first digit is in contact with the apparatus, a second digit having a second fingerprint that has not previously been enrolled and for performing an enrollment process for the second digit without causing the apparatus to provide a user prompt.

Other innovative aspects of the subject matter described in this disclosure may be implemented in an apparatus that includes a fingerprint sensor system and a control system that is configured for communication with the fingerprint sensor system. In some implementations, the control system may be configured for receiving fingerprint sensor data from the fingerprint sensor system and for extracting fingerprint data from the fingerprint sensor data. The fingerprint data may correspond to fingerprints of multiple digits of a user's hand. The control system may be configured for providing a progressive enrollment process for the fingerprint data. The progressive enrollment process may involve storing at least some of the fingerprint data and augmenting stored fingerprint data as a user continues to use an apparatus. According to some examples, control system may be configured for causing at least a portion of the progressive enrollment process to be performed without causing the apparatus to provide user prompts.

The portion may, for example, be an initial portion of the progressive enrollment process, prior to which no fingerprint data for the user has been enrolled. In some examples, the portion may be a portion of the progressive enrollment process that is performed after enrolling fingerprint data corresponding to at least one digit of the user's hand.

According to some implementations, the control system may be configured for increasing a matching threshold after the progressive enrollment process has reached a progressive enrollment threshold. In some implementations, the control system may be configured for pausing or ceasing the progressive enrollment process after the progressive enrollment process has reached a progressive enrollment threshold.

In some examples, the control system may be configured for detecting a first digit in contact with the apparatus. The first digit may, in some examples, have a previously-enrolled first fingerprint. In some such examples, the control system may be configured for detecting, while the first digit is in contact with the apparatus, a second digit having a second fingerprint that has not previously been enrolled and for performing an enrollment process for the second digit without causing the apparatus to provide a user prompt.

In some implementations, the control system may be configured for detecting changed fingerprint data for the previously-enrolled first fingerprint. The changed fingerprint data may have been received from the fingerprint sensor system. In some such implementations, the control system may be configured for initiating a subsequent progressive enrollment process for the first digit. According to some such implementations, the subsequent progressive enrollment process may be initiated after a pause or cessation of a progressive enrollment process for a first digit having a previously-enrolled first fingerprint. In some examples, the subsequent progressive enrollment process may be initiated only if at least one other previously-enrolled fingerprint is detected. In some implementations, the subsequent progressive enrollment process may involve updating a fingerprint template for the first digit.

In some examples, the progressive enrollment process may involve processing fingerprint data corresponding to a first digit of the user's hand during a processing time for fingerprint data corresponding to a second digit of the user's hand. In some implementations, fingerprint sensors of the fingerprint sensor system may be distributed around at least part of a perimeter of the apparatus.

Some innovative aspects of the subject matter described in this disclosure may be implemented in a method. For example, the method may involve controlling one or more devices to provide a progressive enrollment process for the fingerprint data. The progressive enrollment process may involve controlling a fingerprint sensor system to obtain fingerprint data, storing at least some of the fingerprint data and augmenting stored fingerprint data as a user continues to use an apparatus. According to some examples, the progressive enrollment process may involve processing first fingerprint data corresponding to a first digit of the user's hand during a processing time for second fingerprint data corresponding to a second digit of the user's hand.

According to some examples, the method may involve performing at least a portion of the progressive enrollment process without causing the apparatus to provide user prompts. The portion may, for example, be an initial portion of the progressive enrollment process, prior to which no fingerprint data for the user has been enrolled. In some examples, the portion may be a portion of the progressive enrollment process that is performed after enrolling fingerprint data corresponding to at least one digit of the user's hand.

In some examples, the method may involve controlling one or more devices for receiving fingerprint sensor data from a fingerprint sensor system and for extracting fingerprint data from the fingerprint sensor data. The fingerprint data may correspond to fingerprints of multiple digits of a user's hand. The method may involve providing a progressive enrollment process for the fingerprint data. The progressive enrollment process may involve storing at least some of the fingerprint data and augmenting stored fingerprint data as a user continues to use an apparatus. According to some examples, at least a portion of the progressive enrollment process may be performed without causing the apparatus to provide user prompts.

The portion may, for example, be an initial portion of the progressive enrollment process, prior to which no fingerprint data for the user has been enrolled. In some examples, the portion may be a portion of the progressive enrollment process that is performed after enrolling fingerprint data corresponding to at least one digit of the user's hand.

Some or all of the operations, functions and/or methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices for providing a progressive enrollment process for the fingerprint data. The progressive enrollment process may involve controlling a fingerprint sensor system to obtain fingerprint data, storing at least some of the fingerprint data and augmenting stored fingerprint data as a user continues to use an apparatus. According to some examples, the progressive enrollment process may involve processing first fingerprint data corresponding to a first digit of the user's hand during a processing time for second fingerprint data corresponding to a second digit of the user's hand.

According to some examples, the software may include instructions for performing at least a portion of the progressive enrollment process without causing the apparatus to provide user prompts. The portion may, for example, be an initial portion of the progressive enrollment process, prior to which no fingerprint data for the user has been enrolled. In some examples, the portion may be a portion of the progressive enrollment process that is performed after enrolling fingerprint data corresponding to at least one digit of the user's hand.

In some examples, the software may include instructions for controlling one or more devices for receiving fingerprint sensor data from a fingerprint sensor system and for extracting fingerprint data from the fingerprint sensor data. The fingerprint data may correspond to fingerprints of multiple digits of a user's hand. The software may include instructions for providing a progressive enrollment process for the fingerprint data. The progressive enrollment process may involve storing at least some of the fingerprint data and augmenting stored fingerprint data as a user continues to use an apparatus. According to some examples, at least a portion of the progressive enrollment process may be performed without causing the apparatus to provide user prompts.

The portion may, for example, be an initial portion of the progressive enrollment process, prior to which no fingerprint data for the user has been enrolled. In some examples, the portion may be a portion of the progressive enrollment process that is performed after enrolling fingerprint data corresponding to at least one digit of the user's hand.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIG. 7 shows examples of fingerprint data matrices for three different people.

FIGS. 9A and 9B show examples of obtaining partial fingerprints.

DETAILED DESCRIPTION

Figure 1:
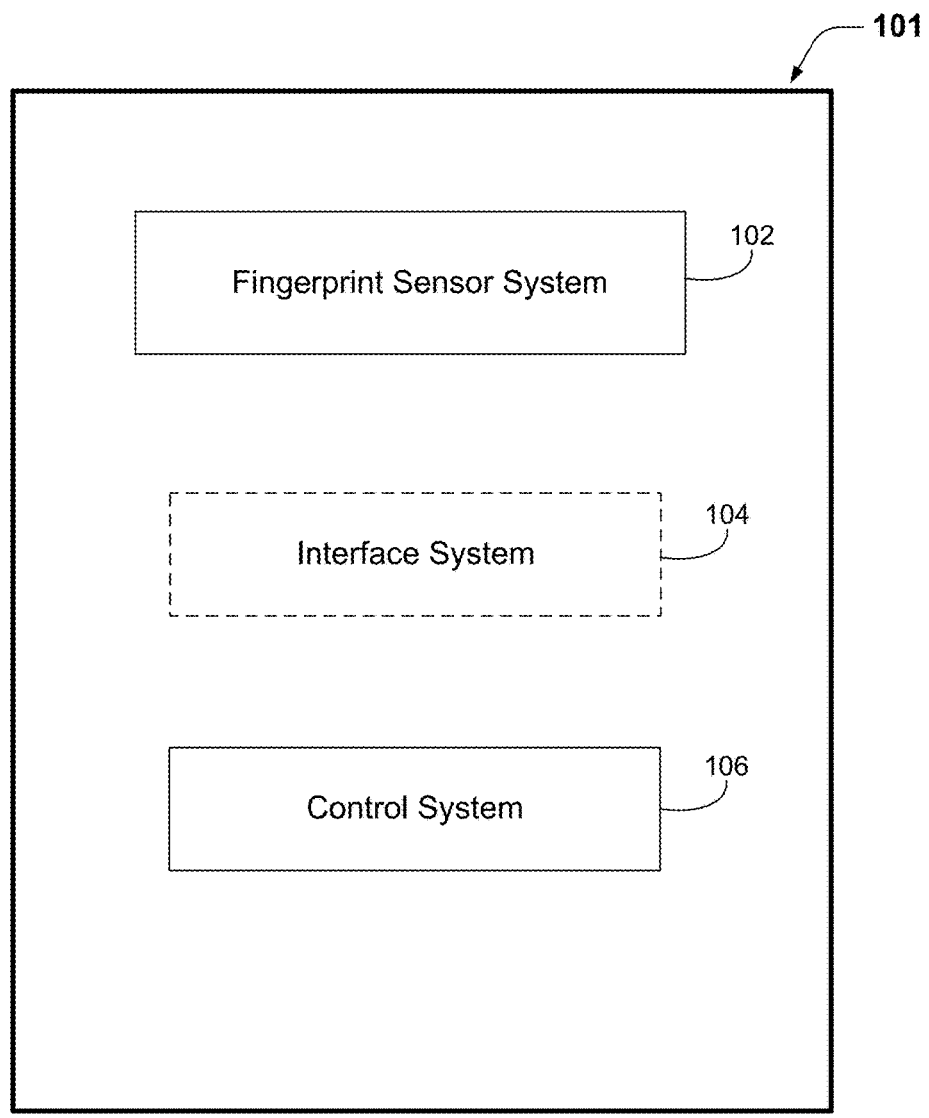
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Some implementations provide a progressive enrollment process of fingerprints for multiple digits. In some implementations, multiple users may be enrolled on the same device via progressive enrollment processes. According to some implementations, a combination of partial fingerprints captured by one or more fingerprint sensors may be sufficient for validating a user. In some such examples, progressive enrollment process of fingerprints for multiple digits may be implemented via a mobile device having fingerprint sensors around at least part of a perimeter of the mobile device. Some implementations may be configured to provide dynamic user account transitions, including transitions from one user to another. In some examples, the fingerprint sensors may be ultrasonic sensors.

Particular implementations of the subject matter described in this disclosure may be implemented to realize one or more of the following potential advantages. In some examples, a progressive enrollment process may take place without user prompts and without the user needing to be aware of the process, potentially even for even the first enrolled fingerprint(s). Some such implementations may provide a progressive enrollment process of fingerprints for multiple digits instead of the manual enrollment process of prior art devices. In some examples, any enrolled user (a "first enrolled user") can simply hand over the device to another enrolled user (a "second enrolled user"), who can start using the device without needing to perform additional steps to invoke an authentication process. Alternatively, the second enrolled user may pick up the device after use by the first enrolled user. However, an authentication process may nonetheless be invoked on the device, so that the second enrolled user may be authenticated before access to the device (or to particular data, software programs, etc.) is granted.

FIG. 1 is a block diagram that shows example components of an apparatus according to some disclosed implementations. In this example, the apparatus 101 includes a fingerprint sensor system 102 and a control system 106. Some implementations of the apparatus 101 may include an interface system 104.

The fingerprint sensor system 102 may comprise various types of sensors, depending on the particular implementation. In some implementations, the fingerprint sensor system 102 may comprise one or more optical sensors, one or more passive or active capacitance sensors and/or one or more radio frequency sensors.

In some examples, the fingerprint sensor system 102 may comprise an ultrasonic sensor system. According to some such examples, the ultrasonic sensor system may include an ultrasonic receiver array and a separate ultrasonic transmitter. In some such examples, the ultrasonic transmitter may include an ultrasonic plane-wave generator, such as those described below. However, some ultrasonic sensor systems may not include a separate ultrasonic transmitter. In some implementations an ultrasonic receiver array and an ultrasonic transmitter may be combined in an ultrasonic transceiver system. For example, in some implementations, the ultrasonic sensor system may include a piezoelectric receiver layer, such as a layer of PVDF polymer or a layer of PVDF-TrFE copolymer. In some implementations, a separate piezoelectric layer may serve as the ultrasonic transmitter. In some implementations, a single piezoelectric layer may serve as both a transmitter and a receiver. In some implementations that include a piezoelectric layer, other piezoelectric materials may be used in the piezoelectric layer, such as aluminum nitride (AlN) or lead zirconate titanate (PZT). The ultrasonic sensor system may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 101 may have a memory system that includes one or more memory devices, though the memory system is not shown in FIG. 1.

The control system 106 may be capable of controlling the fingerprint sensor system 102. The control system 106 may be capable of receiving and processing data from the fingerprint sensor system 102, e.g., from an ultrasonic receiver array. Data received from the fingerprint sensor system 102 may be referred to herein as "fingerprint sensor data," although such data may be manifested as electrical signals. In some implementations, functionality of the control system 106 may be partitioned between one or more controllers or processors, such as a dedicated sensor controller and an applications processor of a mobile device.

According to some implementations, the control system 106 may be configured to provide a progressive enrollment process of fingerprints for multiple digits. As used herein, the phrase "fingerprint" refers generally to a print from any digit, including a thumb. However, in some disclosed examples that specifically refer to a fingerprint from a thumb, the phrase "thumbprint" may also be used. Accordingly, the phrase "thumbprint" as used herein refers to a particular type of "fingerprint." As used herein, the phrase "progressive enrollment process" for fingerprints refers to an enrollment process in which stored fingerprint data corresponding to one or more fingerprints may change over time. As used herein, the term "fingerprint data" may, for example, include fingerprint minutiae, keypoints and/or other such fingerprint features. Accordingly, a progressive enrollment process may involve augmenting and/or changing fingerprint minutiae, keypoints and/or other such fingerprint features, which may have previously been stored in one or more memory devices, over time. According to some implementations, the control system 106 may be configured to provide dynamic user account transitions, including transitions from one user to another. Various examples of progressive enrollment processes and dynamic user account transitions are described below.

Some implementations of the apparatus 101 may include an interface system 104. In some examples, the interface system may include a wireless interface system. In some implementations, the interface system may include a user interface system, one or more network interfaces, one or more interfaces between the control system 106 and a memory system and/or one or more interfaces between the control system 106 and one or more external device interfaces (e.g., ports or applications processors).

The interface system 104 may be configured to provide communication (which may include wired or wireless communication, such as electrical communication, radio communication, etc.) between components of the apparatus 101. In some such examples, the interface system 104 may be configured to provide communication between the control system 106 and the fingerprint sensor system 102. According to some such examples, a portion of the interface system 104 may couple at least a portion of the control system 106 to the fingerprint sensor system 102, e.g., via electrically conducting material. According to some examples, the interface system 104 may be configured to provide communication between the apparatus 101 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces). In some implementations, the apparatus 101 may include a memory system. The interface system 104 may, in some examples, include at least one interface between the control system 106 and a memory system.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In other examples, at least a portion of the apparatus 101 may reside in a doorknob, an automobile door handle, an automobile interior, etc. Various examples are provided herein.

In some implementations, the control system 106 may reside in more than one device. For example, a portion of the control system 106 may reside in one device and another portion of the control system 106 may reside in another device, such as a mobile device (e.g., a smart phone). The interface system 104 also may, in some such examples, reside in more than one device.

Figure 2:
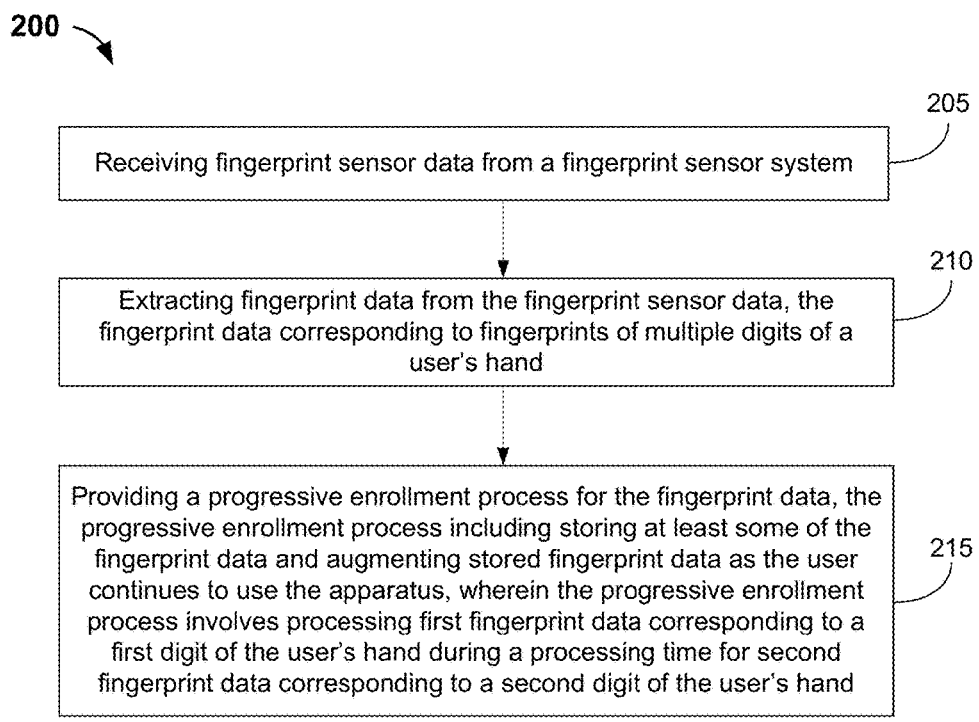
FIG. 2 is a flow diagram that provides examples of fingerprint sensor system operations.

FIG. 2 is a flow diagram that provides examples of fingerprint sensor system operations. The blocks of FIG. 2 (and those of other flow diagrams provided herein) may, for example, be performed by the apparatus 101 of FIG. 1 or by a similar apparatus. As with other methods disclosed herein, the method 200 outlined in FIG. 2 may include more or fewer blocks than indicated. Moreover, the blocks of methods disclosed herein are not necessarily performed in the order indicated.

In this example, block 205 involves receiving fingerprint sensor data from a fingerprint sensor system. Block 205 may, for example, involve receipt by the control system 106 of fingerprint sensor data from the fingerprint sensor system 102.

According to this implementation, block 210 involves extracting fingerprint data from the fingerprint sensor data. As noted above, the term "fingerprint data" may, for example, include fingerprint minutiae, keypoints and/or other features derived from the fingerprint sensor data. In some examples, block 210 may involve extracting fingerprint minutiae such as ridge ending information, ridge bifurcation information, short ridge information, ridge flow information, island information, spur information, delta information, core information, etc., from the fingerprint sensor data.

The type and amount of "fingerprint data" that is extracted in block 210 may vary according to the particular implementation. For example, the type and amount of "fingerprint data" that is extracted in block 210 may depend, at least in part, on the size and/or the distribution of fingerprint sensors of the fingerprint sensor system. In this example, the fingerprint data corresponds to fingerprints of multiple digits of a user's hand. According to some such examples, fingerprint sensors of the fingerprint sensor system may be distributed around at least part of a perimeter of the apparatus. Various examples are provided herein.

In this implementation, block 215 involves providing a progressive enrollment process for the fingerprint data. According to this example, the progressive enrollment process involves processing first fingerprint data corresponding to a first digit of the user's hand during a processing time for second fingerprint data corresponding to a second digit of the user's hand. Accordingly, in such examples a control system may be capable of simultaneously obtaining fingerprint data corresponding to multiple digits. In some such implementations, the apparatus 101 (or a device that includes the apparatus 101) may be configured for simultaneously obtaining fingerprint data corresponding to multiple digits.

Figure 3:
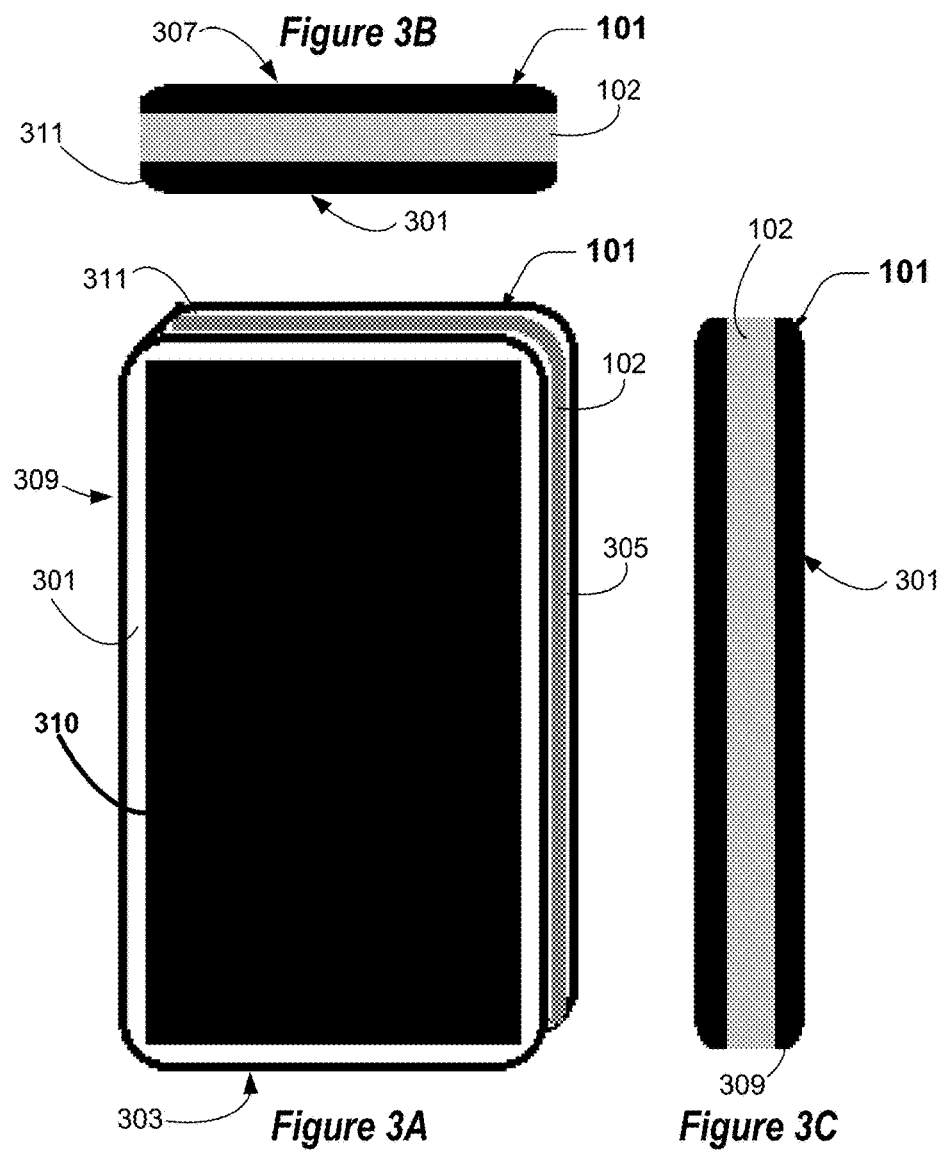
FIGS. 3A-3C illustrate one example of a mobile device configured for obtaining fingerprint data corresponding to multiple digits.

FIGS. 3A-3C illustrate one example of a mobile device configured for obtaining fingerprint data corresponding to multiple digits. In this example, the apparatus 101 is a mobile device having a fingerprint sensor system 102 that includes fingerprint sensors that extend around a perimeter of the mobile device. As used herein, a "perimeter" of a device generally refers to sides of the device other than the main display side (which may be referred to as the "front") and the side opposite the main display side of the device (which may be referred to as the "back"). According to some such implementations, the fingerprint sensors may extend around the entire perimeter of the mobile device, whereas in other implementations the fingerprint sensors may extend around only a portion of the perimeter of the mobile device. The mobile device may, for example, be a smart phone, a phablet, etc. FIG. 3A shows a front perspective view of the apparatus 101. FIG. 3A shows an example of a front side 301 of the apparatus 101, which includes a display 310. In this example, fingerprint sensors of the fingerprint sensor system 102 may be seen extending along part of a perimeter of the apparatus 101, including the right side 305 and the top side 311. There may or may not be fingerprint sensors extend along the bottom side 303 of the apparatus 101, depending on the particular implementation. FIG. 3B shows a top view of the apparatus 101, which shows fingerprint sensors of the fingerprint sensor system 102 extending along the top side 311. In alternative examples, fingerprint sensors of the fingerprint sensor system 102 may not extend along the top side 311. FIG. 3B also indicates the front side 301 and the back side 307. FIG. 3C shows a side view of the apparatus 101, which shows fingerprint sensors of the fingerprint sensor system 102 extending along the left side 309. In some implementations, the fingerprint sensor system 102 may include additional fingerprint sensors in other areas of the mobile device, such as the front side 301 and/or the back side 307. Depending on the thickness of the mobile device, the fingerprint sensors on the perimeter of the mobile device may or may not be capable of obtaining complete fingerprints in a single scan. In some implementations, the fingerprint sensors may obtain only partial fingerprints during a single scan. According to some implementations, a control system 106 of the apparatus 101 may be capable of validating a user based on a combination of partial fingerprints captured by one or more fingerprint sensors of the fingerprint sensor system 102.

Figure 4:
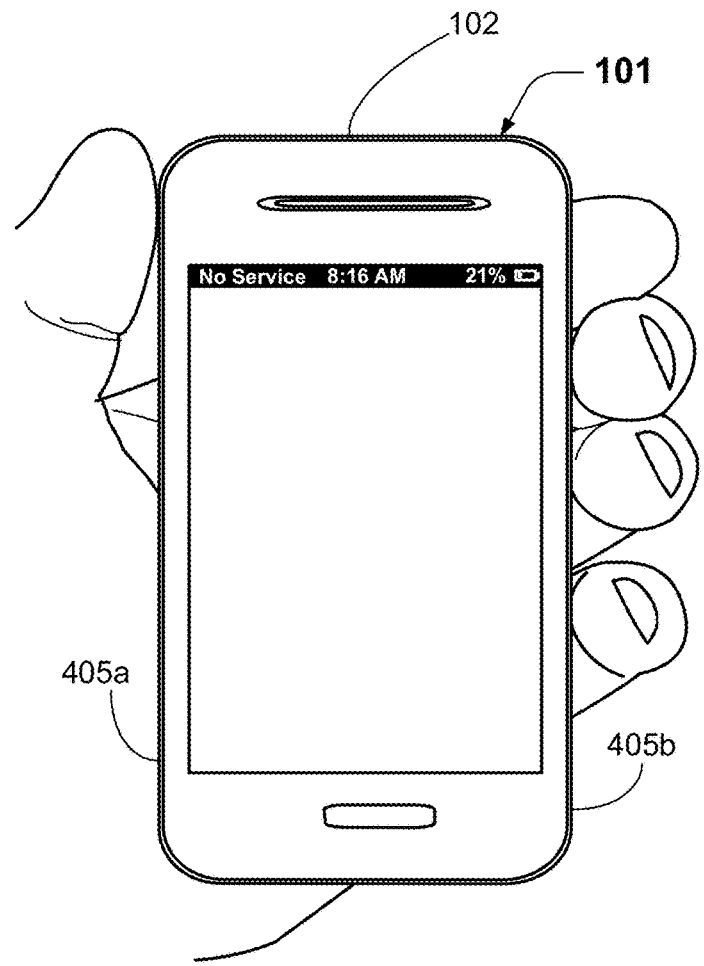
FIG. 4 shows an example of a user holding a mobile device that is configured for obtaining fingerprint data corresponding to multiple digits.

FIG. 4 shows an example of a user holding a mobile device that is configured for obtaining fingerprint data corresponding to multiple digits. Like the device shown in FIGS. 3A-3C, the apparatus 101 is a mobile device that includes fingerprint sensor system 102 having fingerprint sensors that extend around a perimeter of the mobile device. According to some implementations, the fingerprint sensors may extend around only a portion of the perimeter of the mobile device. For example, in some implementations the fingerprint sensors may extend along only sides 405*a* and 405*b* of the mobile device. At the moment illustrated in FIG. 4, the fingerprint sensors extending around the perimeter of the mobile device may simultaneously obtain fingerprint data from the user's left thumb and from at least three of the fingers on the user's left hand. The user may or may not be aware of the fingerprint acquisition process, depending on the particular implementation.

Figure 5:
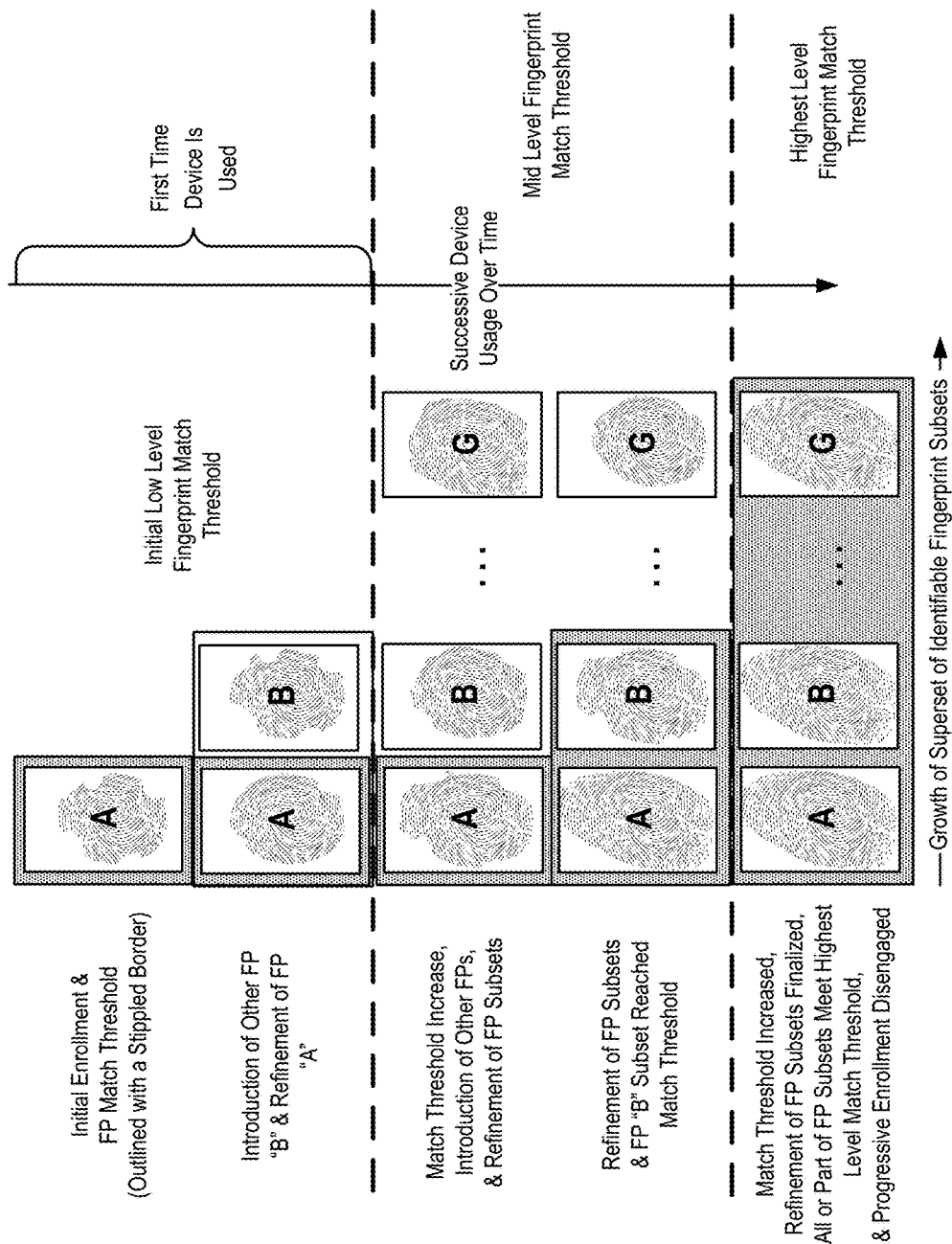
FIG. 5 illustrates one example of a progressive enrollment process for multiple fingerprints.

FIG. 5 illustrates one example of a progressive enrollment process for multiple fingerprints. The flow of FIG. 5 is from top to bottom, beginning with the initial enrollment of a portion of fingerprint A. The portion of fingerprint A may be enrolled, for example, after the user has powered up a new device for the first time and has picked up the device. In the example shown in FIG. 5, the area above the upper dashed line indicates events that occur during the first time that a device, such as a mobile device that embodies the apparatus 101, is used. The For example, if a user turned on the mobile device and held the mobile device as shown in FIG. 4, fingerprint A could be a fingerprint corresponding to the user's thumb or a fingerprint corresponding to any of the other digits holding the apparatus 101.

During the initial enrollment process, fingerprint data (such as fingerprint minutiae) corresponding to the fingerprint A may be obtained and stored. For example, a control system may receive fingerprint sensor data corresponding to the fingerprint A from a fingerprint sensor system. The control system may extract fingerprint data corresponding to the fingerprint A from the fingerprint sensor data and may cause at least some of the fingerprint data to be stored.

After the portion of fingerprint data for fingerprint A is enrolled, in this example that portion is sufficient for unlocking and accessing the new device. In FIG. 5, fingerprints that have a sufficient amount and/or quality of fingerprint data (which may be referred to herein as a "match threshold") to be enrolled fingerprints are shown outlined with a stippled border. In some examples, the match threshold may be a match threshold for account access, a match threshold for file access, a match threshold for device access (such as a match threshold for access to a particular mobile device), match threshold for automobile access, a match threshold for room or building access, etc.

As the user continues to use the device, additional fingerprint data (such as fingerprint minutiae) of the fingerprint A may be obtained and stored, in order to provide a more complete set of fingerprint data for the fingerprint A. During the same time, at least some fingerprint data corresponding to fingerprint B may be obtained. In this example, during the first time that the device is used, a sufficient amount and/or quality of fingerprint data for account access is not obtained for fingerprint B.

Figure 6:
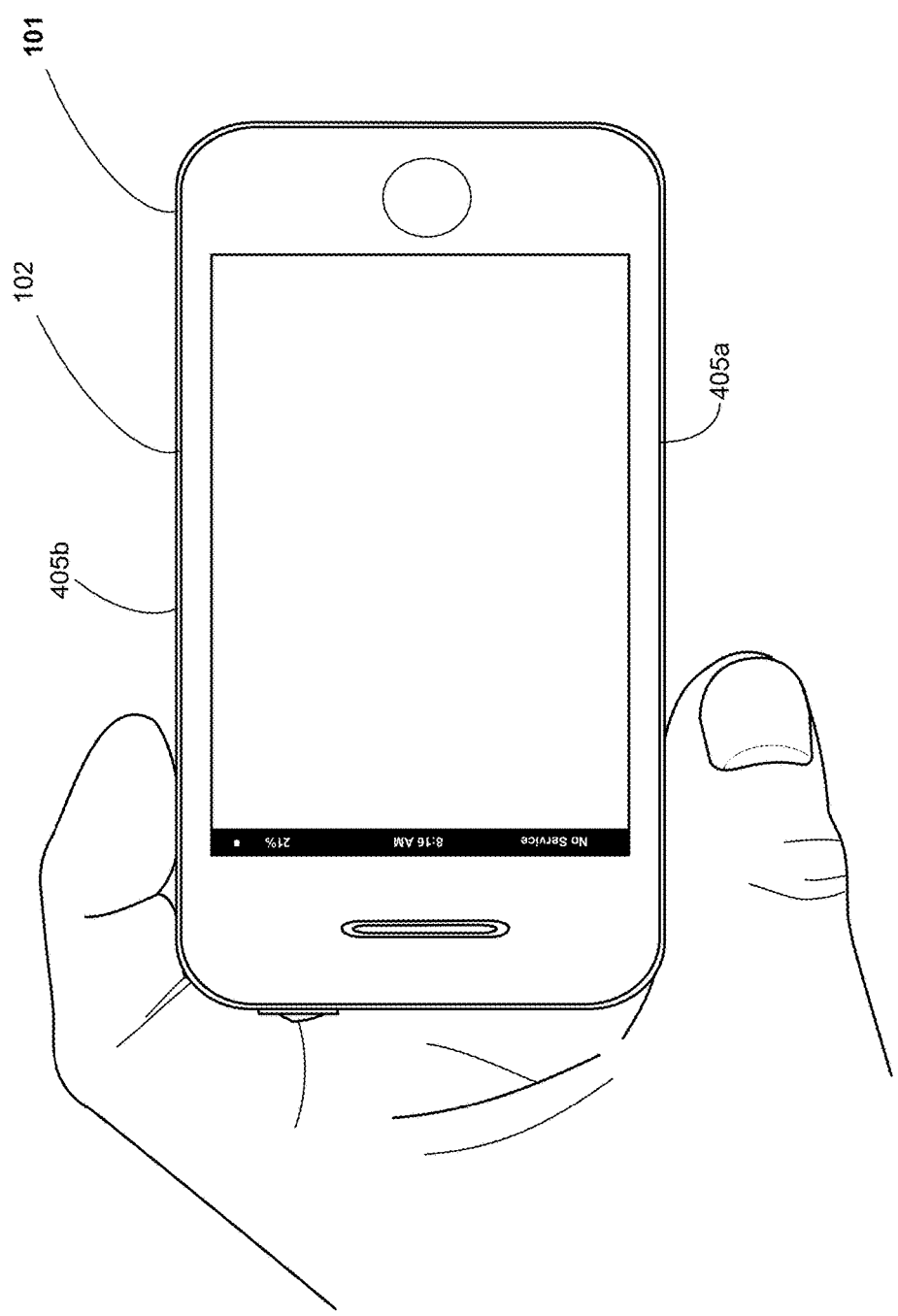
FIG. 6 shows another example of a user holding a mobile device that is configured for obtaining fingerprint data corresponding to multiple digits.

FIG. 6 shows another example of a user holding a mobile device that is configured for obtaining fingerprint data corresponding to multiple digits. Like the device shown in FIGS. 3A-3C, the apparatus 101 is a mobile device that includes fingerprint sensor system 102 having fingerprint sensors that extend around a perimeter of the mobile device. According to some implementations, the fingerprint sensors may extend around only a portion of the perimeter of the mobile device. For example, in some implementations the fingerprint sensors may extend along only sides 405a and 405b of the mobile device. At the moment illustrated in FIG. 6, the fingerprint sensors extending around the perimeter of the mobile device may simultaneously obtain fingerprint data from the user's left thumb and left forefinger. If a user turned on the mobile device and held the mobile device as shown in FIG. 6, fingerprint A could be a fingerprint corresponding to the user's left thumb and fingerprint B could be a fingerprint corresponding to the user's left forefinger, or vice versa. The user may or may not be aware of the fingerprint acquisition process, depending on the particular implementation.

Accordingly, in some examples, fingerprint B may correspond to another digit on the same hand that includes the digit corresponding to fingerprint A. If a user held the mobile device as shown in FIG. 4, fingerprint A could be a fingerprint corresponding to the user's left thumb and fingerprint B could be a fingerprint corresponding to any of the other digits of the user's left hand that are touching the perimeter of the apparatus 101 or touching another part of the apparatus 101 that includes a portion of the fingerprint sensor system 102.

As the user continues to use the device, additional fingerprint data (such as fingerprint minutiae) corresponding to the fingerprints A and B may be obtained and stored, which provides more complete sets of fingerprint data for fingerprints A and B. Accordingly, in this example the progressive enrollment process involves processing first fingerprint data corresponding to a first digit of the user's hand during a processing time for second fingerprint data corresponding to a second digit of the user's hand.

In the example shown in FIG. 5, at least some fingerprint data corresponding to fingerprint A are obtained and stored before fingerprint data corresponding to fingerprint B are obtained and stored. However, in some implementations fingerprint data corresponding to fingerprint A may initially be obtained and stored during the same time, or during substantially the same time, that fingerprint data corresponding to fingerprint B are initially obtained and stored.

In some implementations, at least a portion of the progressive enrollment process may take place without user prompts. For example, during the first time that a user uses a device implementing the apparatus 101, an initial portion of the progressive enrollment process may be performed, prior to which no fingerprint data for the user has been enrolled. In this example, during the initial portion of the progressive enrollment process, fingerprint data corresponding to fingerprint A and fingerprint B may be obtained and stored without user prompts. The apparatus 101 may not require any input from the user during this initial portion of the progressive enrollment process. In some instances, the apparatus 101 may not provide any indication to the user during this initial portion of the progressive enrollment process.

According to some such examples, the control system 106 may be configured for performing one or more other portions of the progressive enrollment process without causing the apparatus 101 to provide user prompts. In some such examples, the portion of progressive enrollment process that is performed without causing the apparatus 101 to provide user prompts may be a portion that is performed after enrolling fingerprint data corresponding to at least one digit of the user's hand. Referring to FIG. 5, for example, this portion of the progressive enrollment process may correspond to a time during which fingerprint A has been enrolled and fingerprint data for one or more of fingerprints B through G is obtained. Accordingly, a user may or may not be aware of at least some parts of a progressive multiple-fingerprint enrollment process. In some implementations a user may or may not be aware of any part of the progressive multiple-fingerprint enrollment process.

In some implementations, a control system may be configured for detecting a first digit in contact with the apparatus (e.g., detecting a first digit that is in contact with the fingerprint sensor system 102). In some instances, the control system may be configured for determining whether that the first digit has a previously-enrolled first fingerprint. If the control system determines that the digit has a previously-enrolled first fingerprint, in some instances the control system be configured for detecting, while the first digit is in contact with the apparatus, a second digit having a second fingerprint that has not previously been enrolled. The control system may be configured for performing an enrollment process for the second digit without causing the apparatus to provide a user prompt.

According to some such examples, when a unique fingerprint "B" (or subsequent fingerprints, "C", "D", etc.) is detected simultaneously with an already enrolled fingerprint "A," for which stored fingerprint data meets the current match threshold, the apparatus 101 may obtain fingerprint data for fingerprint "B." The process of obtaining fingerprint data for fingerprint "B" may continue until such time as stored fingerprint data for fingerprint "B" meets a match threshold. In some such examples, at subsequent times during which fingerprints "A" & "B" are present (indicated by the area between the dashed lines in FIG. 5), fingerprint "B" (or if needed "A" as well) may be augmented with additional fingerprint data to expand and/or to enhance the quality of fingerprint data.

In this example, fingerprints A through G of a single user are eventually enrolled. In some examples, fingerprints A through E may correspond to digits of one of the user's hands and fingerprints F and G may correspond to digits of another of the user's hands. For example, fingerprints A through E may correspond to digits of the hand that the user normally uses to hold the mobile device and fingerprints F and G may correspond to digits of the other hand. In some such examples, fingerprints F and G may correspond to an index finger and a thumb of the other hand, which the user may use to interact with a touch screen of the mobile device.

According to some implementations, the match threshold may increase over time. For example, an increased number of matching fingerprint minutiae may be required for account access, device access, etc., as compared to the number of matching fingerprint minutiae required for account access during an initial period of device usage. Such implementations have the potential advantage of providing greater security as more complete sets of fingerprint data (which may be referred to herein as "fingerprint subsets") are acquired for each digit.

In the example shown in FIG. 5, a control system implements an initial low-level match threshold during the first time the device is used. During some subsequent stage of device usage, the match threshold increases to a mid-level match threshold, indicated by the area between the dashed lines. This match threshold increase is graphically depicted by the relatively more complete image for fingerprint A, indicating a more complete subset of fingerprint data for fingerprint A. Because the match threshold has increased, fingerprint B is not enrolled until a more complete subset of fingerprint data for fingerprint B has also been obtained, at which time the image for fingerprint B is shown with a stippled border.

In this example, at a time indicated by the area below the dashed lines in FIG. 5, the match threshold has increased from the mid-level match threshold to a highest-level match threshold. According to this example, at the time indicated by the area below the dashed lines in FIG. 5, the progressive enrollment process has terminated. In this example, the progressive enrollment process terminates after the enrolled fingerprint data has reached one or more predetermined fingerprint data thresholds. These fingerprint data thresholds may involve a threshold number of fingerprint minutiae, a threshold level of fingerprint data quality, and/or some other threshold(s). At this time, the fingerprint data corresponding to fingerprints A through G has sufficient quantity and/or quality to meet the highest-level match threshold, as indicated by the stippled border around the fingerprint images for fingerprints A through G. Accordingly, in some implementations fingerprint data thresholds may correspond with match thresholds.

In the example shown in FIG. 5, fingerprints A through G of a single user are enrolled. However, some implementations may involve enrolling fingerprints of multiple users on a single device. Moreover, some implementations may involve resuming a progressive enrollment process for a single user under certain conditions, such as a detected change in a user's enrolled fingerprint (e.g., caused by an injury to the corresponding digit). Some examples of each type of implementation are described below.

FIG. 7 shows examples of fingerprint data matrices for three different people. In addition to being referred to as "fingerprint data matrices," such data sets may be referred to herein as "fingerprint data supersets." A fingerprint data matrix is a data set that may include information such as data regarding individual fingerprint minutiae characteristics for a fingerprint, such as fingerprint minutiae type, fingerprint minutiae coordinates (such as X,Y coordinates, X,Y,Z coordinates, polar coordinates, etc.), a fingerprint subset identifier, etc. In some implementations, a fingerprint data matrix may include information regarding the data quality of one or more fingerprint minutiae.

According to this implementation, the fingerprint data matrices are categorized according to the account of a particular user. (The terms "person" and "user" may be used interchangeably herein.) In some examples, a fingerprint data matrix may include one or more pointers, or other such indications, linking a fingerprint data matrix to one or more corresponding features of a person's account. Such features may, for example, include a person's desktop configuration, the person's credit card information, the person's bank account information, an indication of one or more financial accounts, one or more files, physical spaces (such as one or more rooms, one or more buildings, etc.) one or more vehicles, etc., to which the person has access, the level of access to be granted, conditions of access, if any, in-vehicle user preferences, etc.

In some implementations, a fingerprint data matrix may include one or more pointers, or other such indications, linking a fingerprint data matrix to a current state of one or more programs currently in use on a device. For example, a fingerprint data matrix may store a pointer to one or more other caches of information regarding a current web page being browsed, a current playback state of a video or a podcast, a current portion of a document being reviewed, etc.

In the example shown in FIG. 7, Account 1 corresponds to a fingerprint data matrix of a father who typically holds a device with his left hand and has purchase access with a digit (a pointing finger, in this example) on his right hand. In this example, the fingerprint data matrix includes information for identifying the particular digit to which each fingerprint data subset corresponds. Alternative examples may or may not include information for identifying each digit, depending on the particular implementation. Here, Account 2 corresponds to a fingerprint data matrix of a mother who typically holds a device with her right hand and has purchase access with a digit (a pointing finger, in this example) on her left hand. In some examples, an Account 1 & 2 dataset could be considered a single account with a mix of fingerprint data for the mother and the father. In this example, Account 3 corresponds to a fingerprint data matrix for a child.

Accordingly, in some implementations the control system 106 of apparatus 101 may be configured for enrolling multiple authorized users and for creating multiple authorized user accounts. Each of the authorized user accounts may include data for multiple fingerprints.

Some examples may implement a hierarchy of user accounts, with different levels of authority, access, etc. For example, the fingerprint data matrix for the child (corresponding to Account 3 of FIG. 7) may indicate that the child has limited access to certain files, websites and/or financial accounts. In this example, the top three entries for Account 3 indicate fingerprint data for the persons corresponding to Account 1 and Account 2. In this example, the first two entries of Account 3 are "3A," which includes fingerprint data for the right pinky finger of Person 1 and "3B," which includes fingerprint data for the right ring finger of Person 1. In these examples, there is no corresponding fingerprint data for the right pinky finger or the right ring finger of Person 1 in Account 1. According to this example, the third entry for Account 3 references (e.g., via a pointer) corresponding fingerprint data for a right pointing finger in Account 2. These examples show that in some instances there is not necessarily a one-to-one relationship between all of the fingerprint data for an account and the main person (here, the child) corresponding to the account. In other words, a single account may include, or may reference, fingerprint data for more than one person. There are potential advantages of referencing fingerprint data of another account by a pointer (or the like), as opposed to storing redundant copies of fingerprint data of another account. In addition to using less storage space, the use of pointers can facilitate referencing updates to fingerprint data of another account, e.g., when the corresponding finger is injured. Some examples are described below. In some tiered purchase security examples, parental approval (e.g., via fingerprint) may be required before a purchase by the child can be authorized. According to some implementations, only fingerprint data referenced in child's account (such as the fingerprint data referenced in the top three entries for Account 3) may be used to authorize a purchase by the child. In some such examples, any digit of a parent (Account 1 or Account 2) may be used to authorize a purchase by the child. In alternative examples, only a purchase digit of a parent may be used to authorize a purchase by the child. According to some implementations, a particular combination of digits of one or more parents may be used to authorize a purchase by the child.

Some implementations enable single-user purchases and/or confirmations in a high-security context. For example, if an authorized user grips a device in a way that allows a combination of fingerprints, such as all enrolled fingerprints of that user, the device may allow the pointing (or other) finger of the alternate hand to make a purchase or confirmation icon or button actionable. In some implementations, without the gripping action the device may disable the functionality that the pointing (or other) finger intended to execute.

Having multiple user accounts, each of which may include data for multiple fingerprints, can facilitate some dynamic user account transition methods disclosed herein. Some such methods involve "hard" account transitions, such as a transition from a state in which an account is logged out to a state in which the account is logged in, or vice versa. In some implementations, the control system 106 may be configured for automatically making the apparatus 101 transition from a state in which an authorized user is logged out to a state in which the authorized user is logged in, in response to the first contact of the authorized user's digits (e.g., after a period during which the apparatus 101 was turned off, was in a sleep mode, etc.). According to some such examples, the control system 106 may be configured for automatically making the apparatus 101 transition from a state in which the authorized user is logged out to a state in which the authorized user is logged in without causing the apparatus 101 to provide user prompts.

According to some examples, a hard account transition may start when the apparatus 101 is in the possession of an invalid user or is simply not in a valid user's hand. In some implementations, upon the first contact of a device to an enrolled user's digits, the fingerprint sensor system may cause a main processor of the control system to "wake up" and the fingerprint sensor system may perform a fingerprint scan. (As used herein, the term "enrolled user" may be used synonymously with the term "authorized user.") The acquired control system may compare the acquired fingerprint data with stored fingerprint data of enrolled fingerprints via a matching algorithm. If there is a match, in this example the control system will grant the authorized user at least some level of access to the apparatus 101.

For example, in some implementations the apparatus 101 may include a display. In some such implementations, making a transition to the state in which the authorized user is logged in may involve loading the authorized user's desktop configuration and controlling the display to present the authorized user's desktop configuration or loading the authorized user's last window viewed and controlling the display to present the authorized user's last window viewed. In some examples, making a transition to the state in which the authorized user is logged in may involve loading the authorized user's last application. According to some examples, these processes may occur automatically, without any user prompts.

In some implementations, upon the first contact of the device to another person's digits, the control system may cause another fingerprint scan to be performed. The control system may compare the acquired fingerprint data with fingerprint data of enrolled fingerprints via a matching algorithm. If there is no match, in some examples the control system may cause the device to execute appropriate actions to secure the device immediately. Examples include locking car doors, locking a hand-held device, etc.

However, in some alternative examples, the control system may be configured to allow an authorized user to share, at least temporarily, a device with an unauthorized user. For example, the authorized user may wish to show a photo, a video, a web page or other content to an unauthorized user. Such sharing may be referred to herein as a "temporary transition." During a temporary transition, in some examples the control system may recognize that fingerprint data currently being acquired by the fingerprint sensor system correspond with fingerprints of an authorized user and also with fingerprints of an unauthorized user. The control system may be configured to allow the authorized user to share at least some information with the unauthorized user via the apparatus 101. In some implementations, the control system may be configured to conceal certain types of information from the unauthorized user, such as financial account information, documents or other content that have previously been marked as private or confidential, etc.

During a "soft" transition, simultaneous account credentials may be present during a device handoff from one authorized user to another authorized user. For example, in some instances the control system may recognize that fingerprint data currently being acquired by the fingerprint sensor system correspond with fingerprints of a first authorized user and also with fingerprints of a second authorized user. In some examples, instead of completely logging off the first authorized user's account and logging on to the second authorized user's account, a dynamic transition will be performed. According to some implementations, making a dynamic transition between the two account states can reduce the potential delay and increase device efficiency by maintaining the same account characteristics of the first authorized user's session (such as the applications running, user interface, security clearance/privilege/settings, etc.) and only loading and running account characteristics of the second authorized user that are different from those of the first authorized user. In one example, the first authorized user (a parent, in this example) may have a higher level of authority, access, etc., than the second authorized user (a child, in this example). At the time just before the dynamic transition between account states, the first authorized user may have four active software daemons running on a mobile device, such as an Internet browser, YouTube™, Gmail™ and an Amazon™ application. This may be considered a first account state. According to this example, the dynamic transition to a second account state involves no change to the Internet browser, switching the YouTube™ application settings to a child mode that restricts the content of YouTube™ videos available, changing the email accounts that are available for Gmail™ and closing the Amazon™ application, in order to avoid purchases by the child. In another example, the first authorized user is once again a parent that has a higher level of authority, access, etc., than the second authorized user, which is once again a child. At the time just before the dynamic transition between account states, the mobile device is configured such that the first authorized user has the ability to change all high-level operating system (HLOS) settings. According to this example, the dynamic transition to a second account state involves turning off Long-Term Evolution (LTE) data and making changes to LTE data settings inaccessible in the settings menu, in order to channel internet traffic through a local router. In this example, the dynamic transition to a second account state involves restricting or preventing changes to security settings and restricting or preventing access to a backup and reset option, in order to prevent inadvertent changes such as secure digital (SD) card encryption, the child accidentally invoking a factory reset operation, etc.

Accordingly, in some such implementations, a control system may be configured for determining that fingerprint data currently being acquired by the fingerprint sensor system corresponds with fingerprints of a first authorized user and fingerprints of a second authorized user. The control system may be configured for invoking account characteristics of the second authorized user without logging out the first authorized user.

In some examples, the control system may recognize that fingerprint data currently being acquired by the fingerprint sensor system correspond with fingerprints of an authorized user having a relatively higher level of authority, access rights, etc. (a "higher-level authorized user") and also with fingerprints of a user with a relatively lower level of authority, access rights, etc. (a "lower-level authorized user"). The control system may be configured to allow the higher-level authorized user to share at least some information with the lower-level authorized user via the apparatus 101. In some implementations, the control system may be configured to conceal certain types of information from the lower-level authorized user, such as financial account information, documents or other content that have previously been marked as private or confidential, etc. In some temporary transition examples, the control system may be configured to grant temporary access to the lower-level authorized user. For example, the control system may be configured to grant temporary access to certain application-specific functionalities or other device operating system functionalities.

Figure 8:
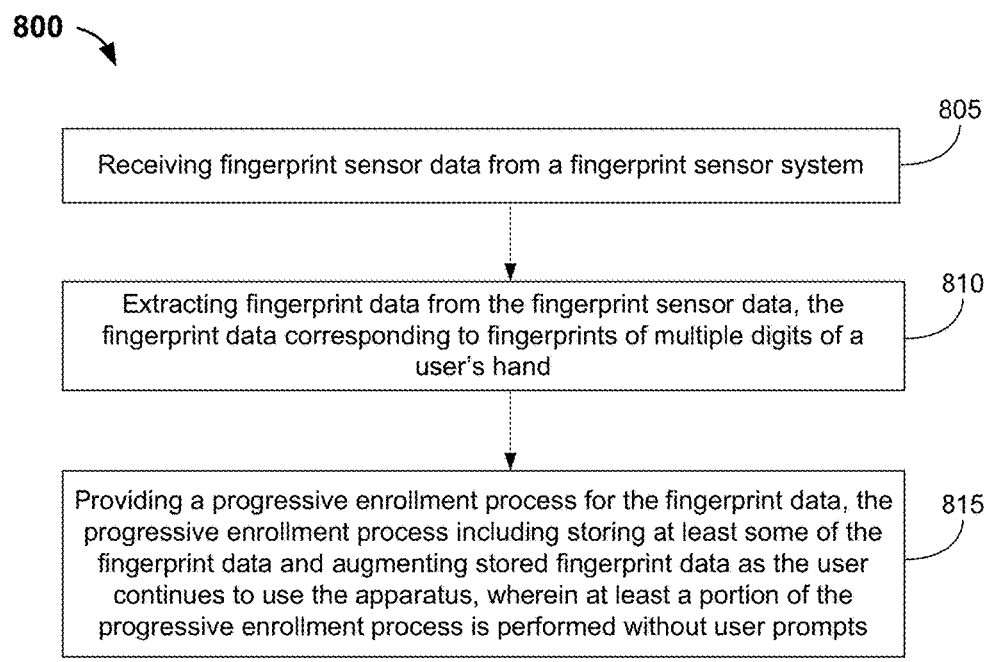
FIG. 8 is a flow diagram that provides further examples of fingerprint sensor system operations.

FIG. 8 is a flow diagram that provides further examples of fingerprint sensor system operations. The blocks of FIG. 8 (and those of other flow diagrams provided herein) may, for example, be performed by the apparatus 101 of FIG. 1 or by a similar apparatus. As with other methods disclosed herein, the method 800 outlined in FIG. 8 may include more or fewer blocks than indicated. Moreover, the blocks of methods disclosed herein are not necessarily performed in the order indicated.

In this example, block 805 involves receiving fingerprint sensor data from a fingerprint sensor system. Block 805 may, for example, involve receipt by the control system 106 of fingerprint sensor data from the fingerprint sensor system 102.

According to this implementation, block 810 involves extracting fingerprint data from the fingerprint sensor data. As noted above, the term "fingerprint data" may, for example, include fingerprint minutiae, keypoints and/or other features derived from the fingerprint sensor data. In some examples, block 810 may involve extracting fingerprint minutiae such as ridge ending information, ridge bifurcation information, short ridge information, ridge flow information, island information, spur information, delta information, core information, etc., from the fingerprint sensor data.

The type and amount of "fingerprint data" that is extracted in block 810 may vary according to the particular implementation. For example, the type and amount of "fingerprint data" that is extracted in block 810 may depend, at least in part, on the size and/or the distribution of fingerprint sensors of the fingerprint sensor system. In this example, the fingerprint data corresponds to fingerprints of multiple digits of a user's hand. According to some such examples, fingerprint sensors of the fingerprint sensor system may be distributed around at least a portion of a perimeter of the apparatus.

In this implementation, block 815 involves providing a progressive enrollment process for the fingerprint data. According to this example, the progressive enrollment process involves storing at least some of the fingerprint data and augmenting stored fingerprint data as the user continues to use the apparatus. In this example, at least a portion of the progressive enrollment process is performed without user prompts. In some examples, such as those described above with reference to FIG. 5, the portion may be an initial portion of the progressive enrollment process, prior to which no fingerprint data for the user has been enrolled. According to some examples, the portion may be a portion of the progressive enrollment process that is performed after enrolling fingerprint data corresponding to at least one digit of the user's hand.

Referring again to FIG. 5, as the user continues to use the device additional fingerprint data (such as fingerprint minutiae) corresponding to the fingerprints A and B may be obtained and stored, which provides more complete sets of fingerprint data for fingerprints A and B. Accordingly, in this example the progressive enrollment process involves processing first fingerprint data corresponding to a first digit of the user's hand during a processing time for second fingerprint data corresponding to a second digit of the user's hand.

Accordingly, in such examples a control system may be capable of simultaneously obtaining fingerprint data corresponding to multiple digits. In some such implementations, the apparatus 101 (or a device that includes the apparatus 101) may be configured for simultaneously obtaining fingerprint data corresponding to multiple digits.

In some implementations, a control system may be configured for detecting a first digit in contact with the apparatus (e.g., detecting a first digit that is in contact with the fingerprint sensor system 102). In some instances, the control system may be configured for determining whether that the first digit has a previously-enrolled first fingerprint. If the control system determines that the digit has a previously-enrolled first fingerprint, in some instances the control system be configured for detecting, while the first digit is in contact with the apparatus, a second digit having a second fingerprint that has not previously been enrolled. The control system may be configured for performing an enrollment process for the second digit without causing the apparatus to provide a user prompt.

According to some implementations, the control system may be further configured for increasing a matching threshold after the progressive enrollment process has reached a progressive enrollment threshold. The progressive enrollment threshold may correspond with a fingerprint data threshold. For example, an increased number of matching fingerprint minutiae may be required for account access, device access, etc., as compared to the number of matching fingerprint minutiae required for account access during an initial period of device usage. In some examples, an increased level of quality of fingerprint data may be required, as compared to the quality of fingerprint data required for account access during an initial period of device usage. As noted above, in some implementations the control system may be further configured for pausing or ceasing the progressive enrollment process after the progressive enrollment process has reached a progressive enrollment threshold.

In some examples, such as shown in FIGS. 3A-3C and described above, the apparatus 101 may be a mobile device having a fingerprint sensor system 102 that includes fingerprint sensors that extend around a perimeter of the mobile device. According to some implementations, the fingerprint sensors may extend around only a portion of the perimeter of the mobile device. The mobile device may, for example, be a smart phone, a phablet, etc. The fingerprint sensor system 102 may include additional fingerprint sensors in other areas of the mobile device.

Depending on the thickness of the mobile device, the fingerprint sensors on the perimeter of the mobile device may or may not be capable of obtaining complete fingerprints in a single scan. In some implementations, the fingerprint sensors may obtain only partial fingerprints during a single scan. According to some implementations, a control system 106 of the apparatus 101 may be capable of validating a user based on a combination of partial fingerprints captured by one or more fingerprint sensors of the fingerprint sensor system 102.

FIGS. 9A and 9B show examples of obtaining partial fingerprints. In FIG. 9A, circular fingerprint sensor areas 102*a* and 102*b* are shown obtaining partial fingerprints 905*a* and 905*b* from two different areas of a digit 901. FIG. 9A may represent either the same portion of a fingerprint sensor system 102 obtaining partial fingerprints 905*a* and 905*b* at two different times or two different portions of fingerprint sensor system 102 obtaining partial fingerprints 905*a* and 905*b* at substantially the same time. In addition to the relatively small fingerprint sensor areas 102*a* and 102*b*, only a limited portion of the digit's fingerprint has been presented by the user to the fingerprint sensor system 102 in both examples. The partial fingerprints 905*a* and 905*b* are from peripheral areas of the digit 901 that do not, for example, include the central whorl.

In FIG. 9B, substantially rectangular fingerprint sensor areas 102*c* and 102*d* are shown obtaining partial fingerprints 905*c* and 905*d* from two different areas of the digit 901. The fingerprint sensor areas 102*c* and 102*d* may, for example, correspond to portions of a fingerprint sensor system 102 that are disposed around at least part of a perimeter of a mobile device, such as shown in FIGS. 3A-3C. In one of these examples, as represented by the partial fingerprint 905*d*, the user has presented the central whorl portion of the digit's fingerprint to the fingerprint sensor system 102. However, due to the relatively narrow width of the fingerprint sensor areas 102*c* and 102*d*, only a limited portion of the digit's fingerprint has been captured.

Figure 10:
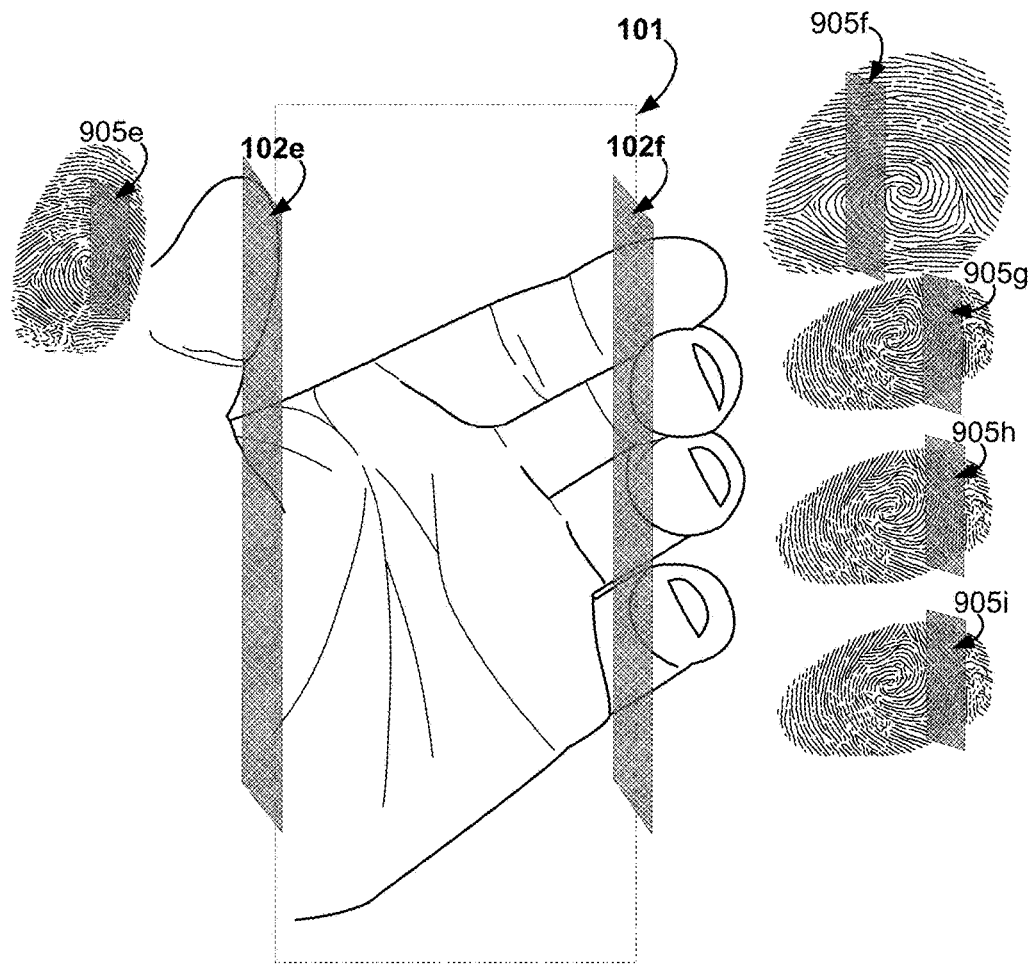
FIG. 10 shows examples of obtaining partial fingerprints from portions of a fingerprint sensor system that are disposed around at least a portion of a perimeter of a mobile device.

FIG. 10 shows examples of obtaining partial fingerprints from portions of a fingerprint sensor system that are disposed around at least a portion of a perimeter of a mobile device. The fingerprint sensor areas 102*e* and 102*f* may, for example, correspond to portions of a fingerprint sensor system 102 that are disposed around at least part of a perimeter of a mobile device, such as shown in FIGS. 3A-3C. In this example, a user is holding an apparatus 101 (only an outline of which is shown in FIG. 10) as shown in FIG. 4.

At the time illustrated in FIG. 10, the fingerprint sensor area 102*e* is obtaining partial fingerprint 905*e* and from the user's left thumb and the fingerprint sensor area 102*f* is obtaining partial fingerprints 905*f*-905*i* from four of the fingers on the user's left hand. If only one of the partial fingerprints 905*e*-905*i* were being obtained (e.g., if only partial fingerprint 905*e* were being obtained), only a few fingerprint minutiae would be available for performing an authentication process. However, the additional fingerprint minutiae from the other four partial fingerprints make significantly more biometric data available, allowing a much more reliable authentication process to be performed.

Figure 11A:
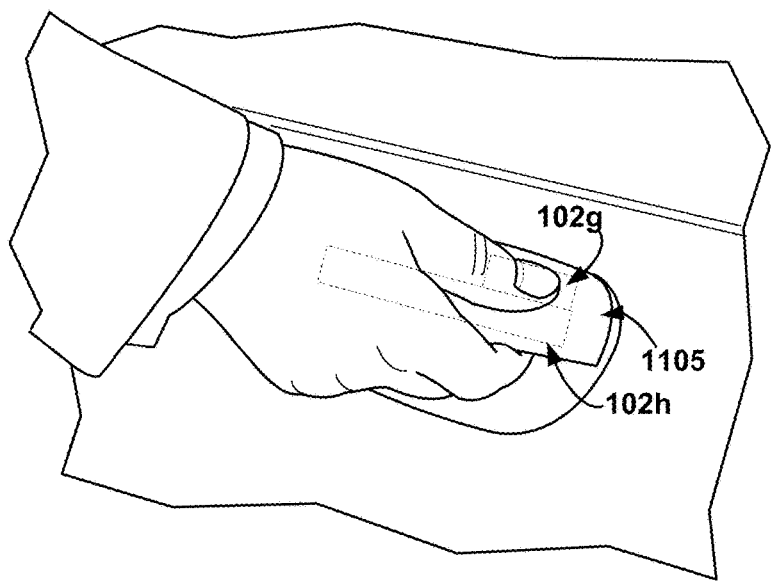
FIGS. 11A and 11B show examples of door handles that are configured for obtaining fingerprints from multiple digits.
Figure 11B:
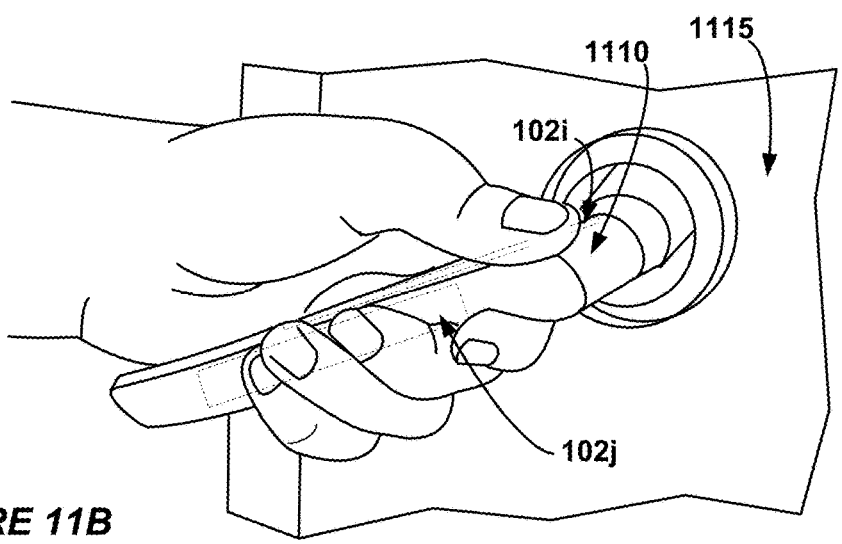

FIGS. 11A and 11B show examples of door handles that are configured for obtaining fingerprints from multiple digits. In the example shown in FIG. 11A, the fingerprint sensor area 102*g* is located on an outside portion of the automobile door handle 1105 and the fingerprint sensor area 102*h* is located on an inside portion of the automobile door handle 1105. Depending on the dimensions of the fingerprint sensor areas 102*g* and 102*h*, as well as the way that a user grips the automobile door handle 1105, the fingerprints obtained via the fingerprint sensor areas 102*g* and 102*h* may be partial fingerprints or substantially complete fingerprints.

The fingerprint sensor areas 102*g* and 102*h* may be configured for communication with at least a portion of a control system, which may be a control system of the automobile. In some implementations, the control system may be configured to control access to the automobile depending on whether fingerprint data based on fingerprints obtained via the fingerprint sensor areas 102*g* and 102*h* match stored fingerprint data of an authorized user. According to some implementations, the access determination is based on fingerprint data from multiple digits of a user's hand. Such access determinations will generally be more reliable than an access determination based on fingerprint data from a single digit. In some implementations, the control system may be capable of providing a progressive enrollment process, which in some examples may involve multiple digits.

In the example shown in FIG. 11B, the fingerprint sensor area 102*i* is located on an upper portion of the door handle 1110 and the fingerprint sensor area 102*j* is located on an outer portion of the door handle 1110. The fingerprint sensor areas 102*i* and 102*j* may be configured for communication with at least a portion of a control system, which may be a control system of the door 1115, a control system of a home security system, a control system of a hotel security system, etc. In some implementations, the control system may be configured to control access to a room, a building, etc., depending on whether fingerprint data based on fingerprints obtained via the fingerprint sensor areas 102*i* and 102*j* match stored fingerprint data of an authorized user. The access determination may be based on fingerprint data from multiple digits of a user's hand. In some implementations, the control system may be capable of providing a progressive enrollment process, which in some examples may involve multiple digits.

Figure 12:
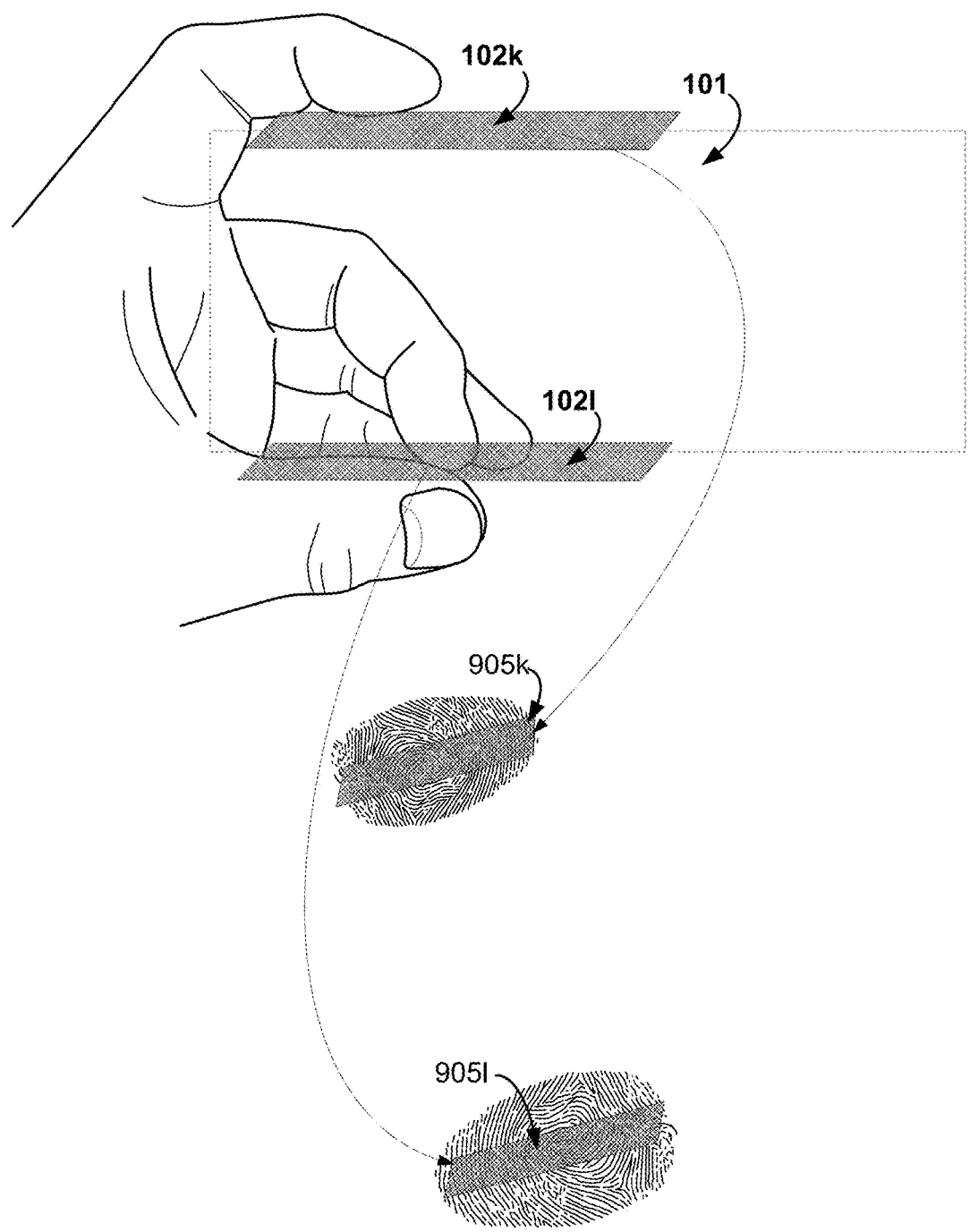
FIG. 12 shows an alternative example of obtaining partial fingerprints via portions of a fingerprint sensor system that are disposed around at least part of a perimeter of a mobile device.

FIG. 12 shows an alternative example of obtaining partial fingerprints via portions of a fingerprint sensor system that are disposed around a perimeter of a mobile device. The fingerprint sensor areas 102*k* and 102*l* may, for example, correspond to portions of a fingerprint sensor system 102 that are disposed around at least part of a perimeter of a mobile device, such as shown in FIGS. 3A-3C. In this example, a user is holding an apparatus 101 (only an outline of which is shown in FIG. 10) as shown in FIG. 6.

At the time illustrated in FIG. 12, the fingerprint sensor area 102*l* is obtaining partial fingerprint 905*l* and from the user's left thumb and the fingerprint sensor area 102*k* is obtaining the partial fingerprint 905*k* from the index finger of the user's left hand. If only the partial fingerprint 905*k* or the partial fingerprint 905*l* were being obtained, fewer fingerprint minutiae would be available for performing an authentication process. However, the additional fingerprint minutiae from the partial fingerprint makes more biometric data available, allowing a more reliable authentication process to be performed.

Figure 13A:
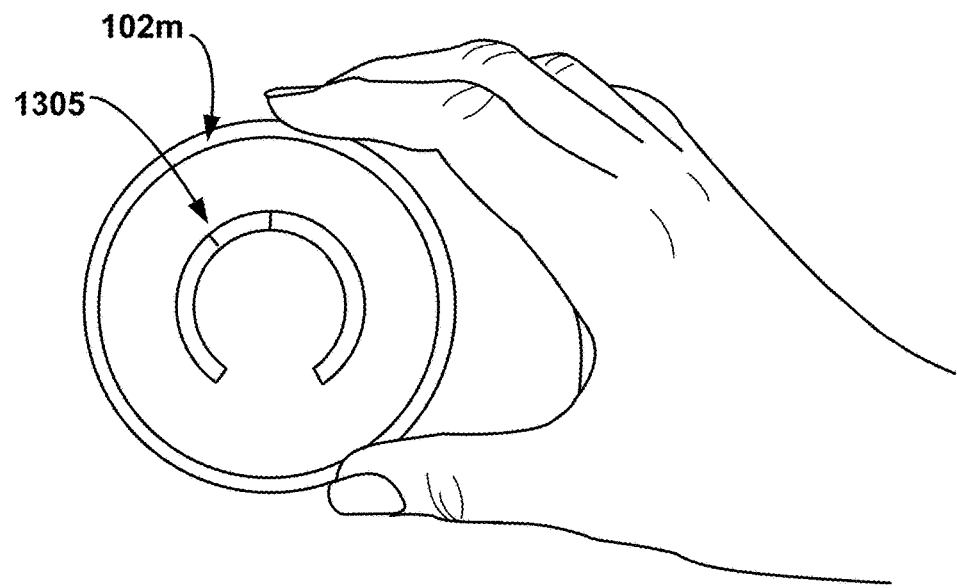
FIGS. 13A and 13B show additional examples of devices that are configured for obtaining fingerprints from multiple digits.
Figure 13B:
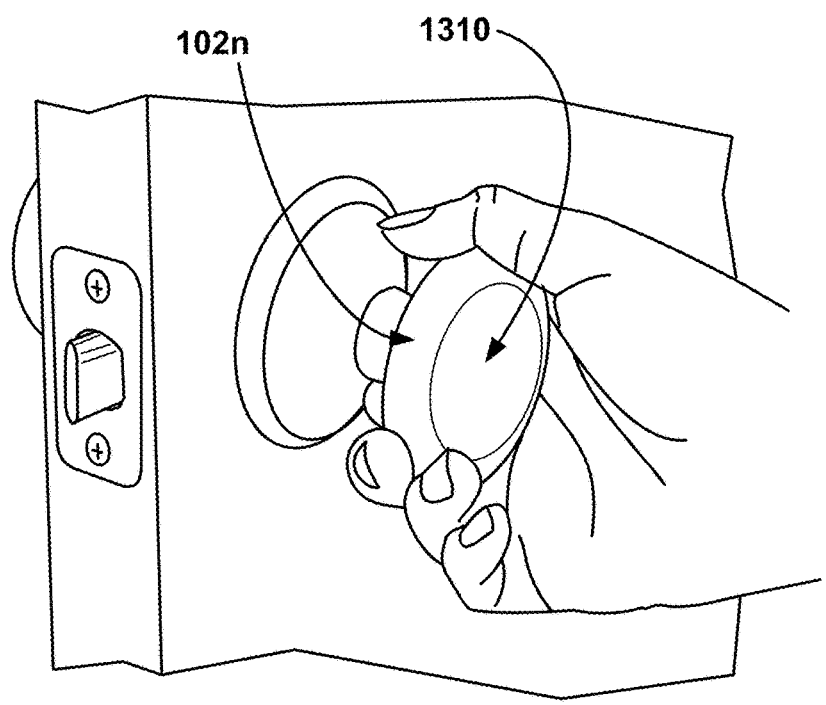

FIGS. 13A and 13B show additional examples of devices that are configured for obtaining fingerprints from multiple digits. In the example shown in FIG. 13A, the fingerprint sensor area 102*m* is located around a perimeter of a thermostat 1305. The fingerprint sensor area 102*m* may be configured for communication with a control system, which may be, or may include, a control system for a heating system, an HVAC (heating, ventilation and air conditioning) system, etc. In some implementations, the control system may be configured to control access to an HVAC system depending on whether fingerprint data based on fingerprints obtained via the fingerprint sensor area 102*m* match stored fingerprint data of an authorized user. According to some implementations, the access determination may be based on fingerprint data from multiple digits of a user's hand. Such access determinations may, for example, prevent unauthorized users from tampering with a heating system or an HVAC system. In some implementations, the control system may be capable of providing a progressive enrollment process, which in some examples may involve multiple digits.

In the example shown in FIG. 13B, the fingerprint sensor area 102*n* is located around a perimeter of a doorknob 1310. The fingerprint sensor area 102*n* may be configured for communication with a control system, which may be, or may include, a control system for a door, a building security system, etc. In some implementations, the control system may be configured to control access to a room and/or to a building depending on whether fingerprint data based on fingerprints obtained via the fingerprint sensor area 102*n* match stored fingerprint data of an authorized user. According to some implementations, the access determination may be based on fingerprint data from multiple digits of a user's hand. In some implementations, the control system may be capable of providing a progressive enrollment process, which in some examples may involve multiple digits.

Figure 14A:
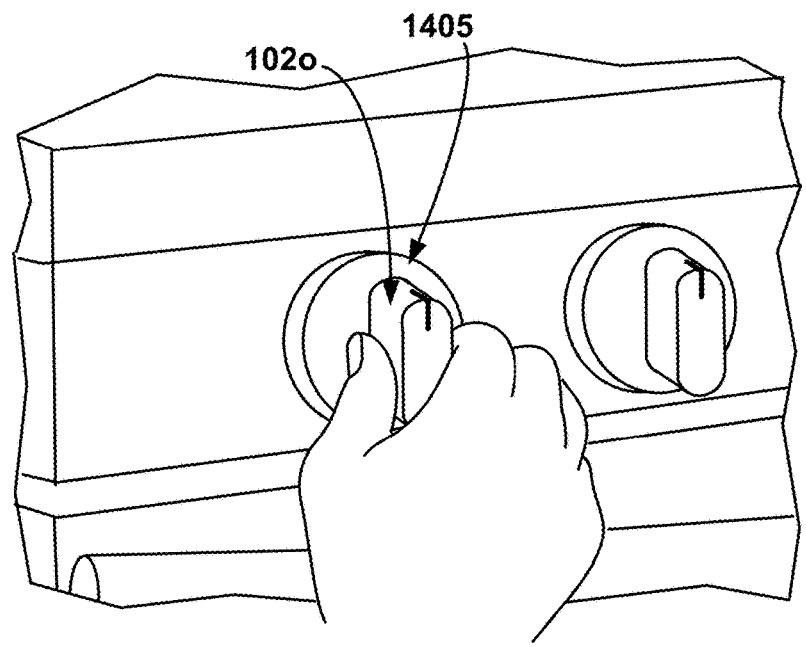
FIGS. 14A and 14B show examples of other devices that are configured for obtaining fingerprints from multiple digits.
Figure 14B:
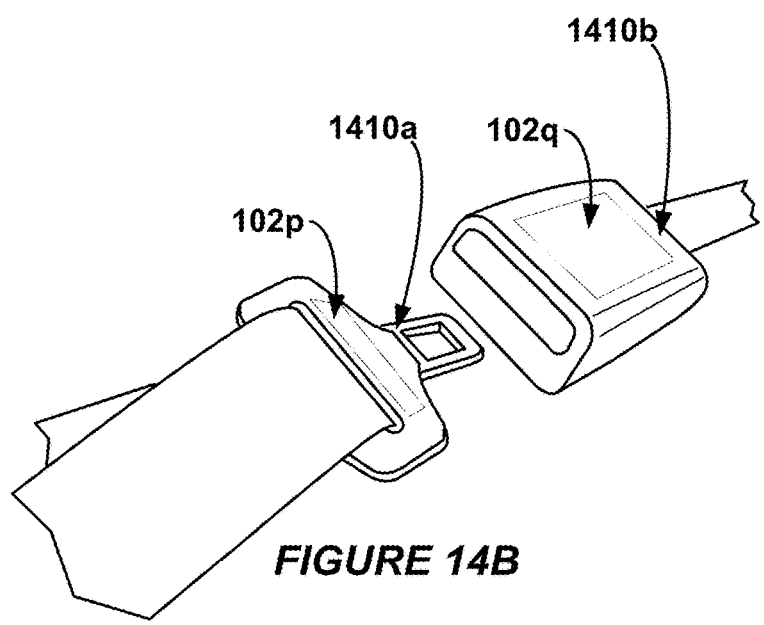

FIGS. 14A and 14B show examples of other devices that are configured for obtaining fingerprints from multiple digits. In the example shown in FIG. 14A, the fingerprint sensor area 102*o* is located around a perimeter of a stove knob 1405. Other stove knobs may also include fingerprint sensor areas, depending on the particular implementation. The fingerprint sensor area 102*o* may be configured for communication with a control system, which may be, or may include, a control system for the stove. In some implementations, the control system may be configured to control access to the stove depending on whether fingerprint data based on fingerprints obtained by the fingerprint sensor area 102*o* match stored fingerprint data of an authorized user. According to some implementations, the access determination may be based on fingerprint data from multiple digits of a user's hand. Such access determinations may, for example, prevent children from using the stove. In some implementations, the control system may be capable of providing a progressive enrollment process, which in some examples may involve multiple digits.

In the example shown in FIG. 14B, the fingerprint sensor area 102*p* is located on a tab portion 1410*a* of a seat belt and the fingerprint sensor area 102*q* is located on a buckle portion 1410*b* of the seat belt. In some implementations, additional fingerprint sensor areas may be disposed on an opposing side of the tab portion 1410*a* and/or the buckle portion 1410*b*. Accordingly, the fingerprint sensor area 102*p* may be configured to obtain one or more fingerprints from one hand, such as a user's left hand, and the fingerprint sensor area 102*q* may be configured to obtain one or more fingerprints from another hand, such as the user's right hand.

The fingerprint sensor areas 102*p* and 102*q* may be configured for communication with at least a portion of a control system, which may be a control system of an automobile in some examples. In some implementations, the control system may be configured to control access to an automobile depending on whether fingerprint data based on fingerprints obtained via the fingerprint sensor areas 102*p* and 102*q* match stored fingerprint data of an authorized user. For example, the control system may be configured to prevent the automobile's engine from starting, or to prevent an electric automobile from operating, unless fingerprint data based on fingerprints obtained via the fingerprint sensor areas 102*p* and 102*q* match stored fingerprint data of an authorized user. In some examples, the access determination may be based on fingerprint data from at least one digit of both of a user's hands. In some implementations, the control system may be capable of providing a progressive enrollment process, which in some examples may involve multiple digits.

Figure 15A:
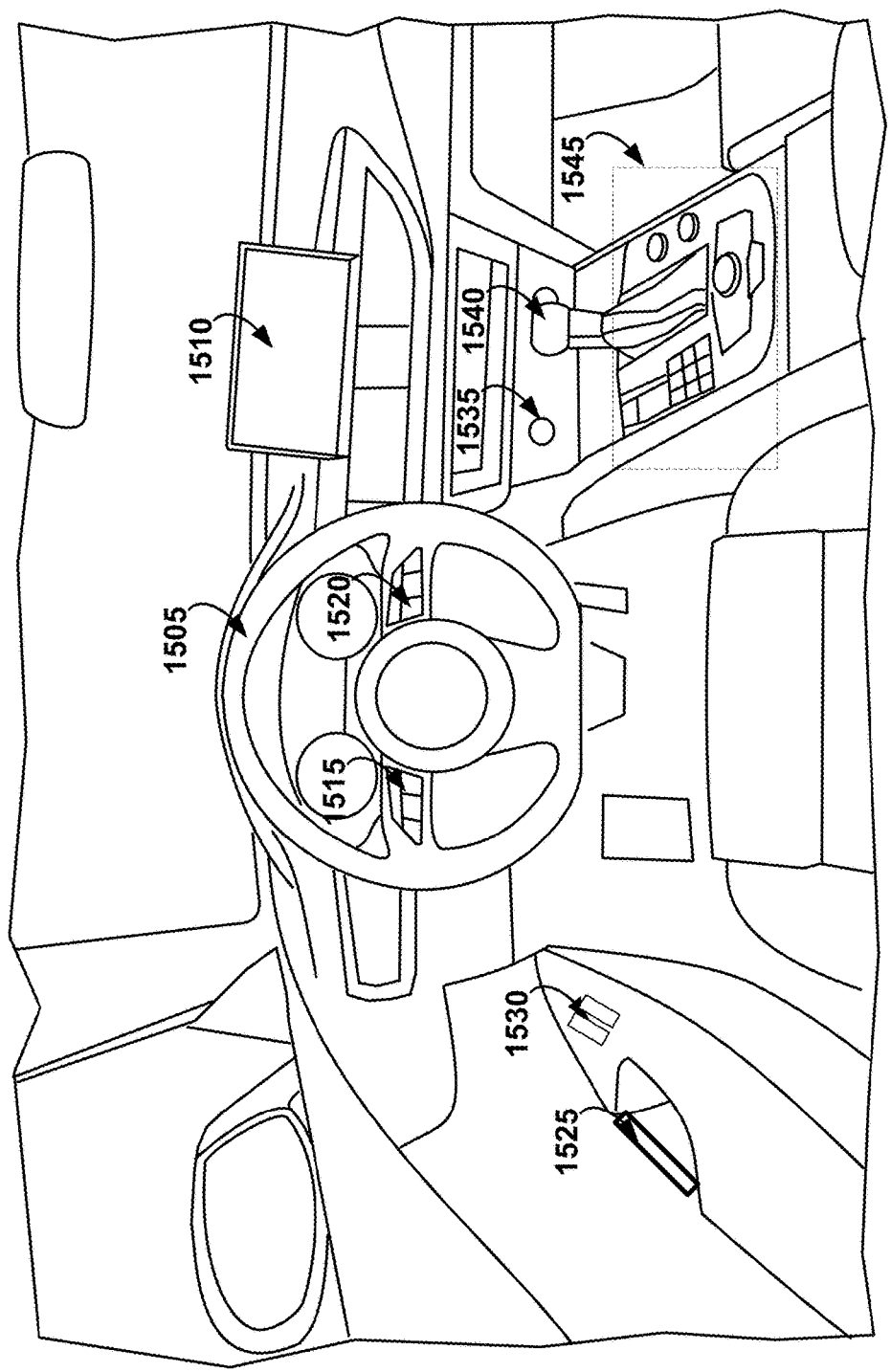
FIGS. 15A-15C illustrate additional automobile-related implementations.
Figure 15B:
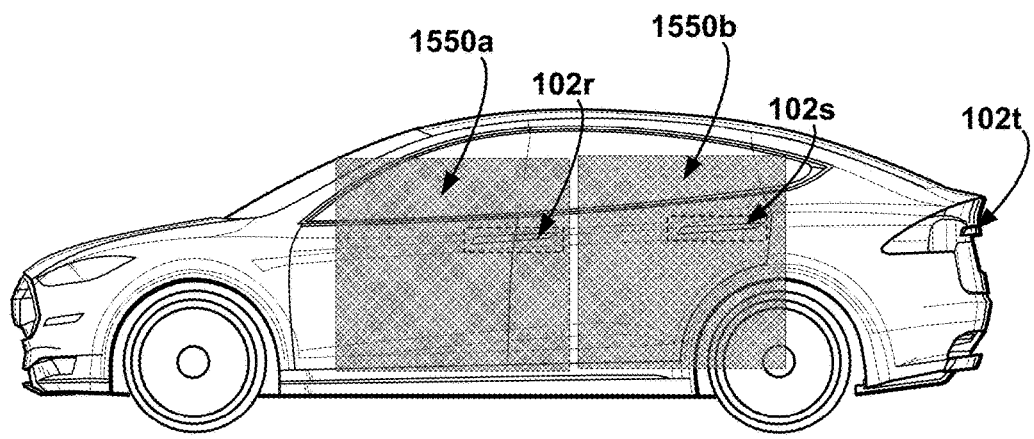
Figure 15C:
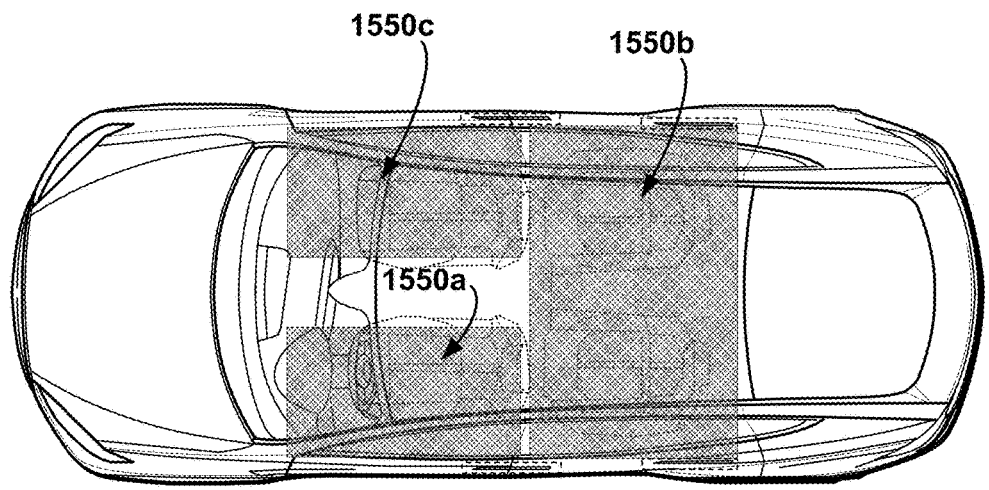

FIGS. 15A-15C illustrate additional automobile-related implementations. FIG. 15A indicates various components of an automobile interior on which, or within which, fingerprint sensor areas may be disposed. These areas include the steering wheel 1505, the display 1510, the control areas 1515 and 1520, the interior door handle 1525, the window controls 1530, the control 1535, the stick shift 1540 and the control panel 1545. These are merely examples. Some implementations may include fingerprint sensor areas that are disposed on, or within, none, some or all of these components. The fingerprint sensor area(s) may be configured for communication with at least a portion of a control system of the automobile. In some implementations, the control system may be configured to control access to the automobile, or at least to certain features of the automobile, depending on whether fingerprint data based on fingerprints obtained via the fingerprint sensor area(s) match stored fingerprint data of an authorized user. In some implementations, the control system may be capable of providing a progressive enrollment process, which in some examples may involve multiple digits.

Some components may be more advantageous than others for the inclusion of fingerprint sensor areas. For example, if fingerprint sensor areas are included on the steering wheel 1505, this may allow a fingerprint sensor system to obtain fingerprint sensor data from multiple digits of both of a user's hands. If fingerprint sensor areas are included on the interior door handle 1525 and/or the stick shift 1540, this may allow a fingerprint sensor system to obtain fingerprint sensor data from multiple digits of a single hand. However, interacting with a button of a control panel may only require a single digit, which would allow a fingerprint sensor system to obtain fingerprint sensor data only from that single digit.

FIGS. 15B and 15C show examples of zones within an automobile's interior. Referring first to FIG. 15B, in this example zone 1550a includes the front seating areas of the automobile and zone 1550b includes the rear seating areas of the automobile. In this example, the fingerprint sensor area 102r is included on the front left exterior door handle, the fingerprint sensor area 102s is included on the on the rear left exterior door handle and the fingerprint sensor area 102t is included on the exterior trunk handle.

In the example shown in FIG. 15C, the zone 1550a includes only the driver seating area of the automobile and zone 1550c includes only the front passenger seating area of the automobile. As before, zone 1550b includes all of the rear seating areas of the automobile. In alternative implementations, the rear seating areas of the automobile may have two or more corresponding zones.

According to some examples, a control system of the automobile may determine whether an identifiable user is currently sitting within a predetermined zone of the automobile. For example, the control system may identify the user according to fingerprint data obtained from fingerprints captured via one or more corresponding fingerprint sensor areas. In some examples, the one or more corresponding fingerprint sensor areas may be within the corresponding zone, e.g., as shown in FIG. 15A. Alternatively, or additionally, the one or more corresponding fingerprint sensor areas may be on, or within, a door handle area of an automobile door that allows access to the corresponding zone. For example, the identity of a user entering zone 1550b may be determined according to fingerprint data obtained from fingerprint sensor data obtained by the fingerprint sensor area 102s.

In some examples, user preference setting data may be stored for the zones 1550a, 1550b and/or 1550c. The user preference setting data may, for example, indicate seat adjustment settings, temperature settings, audio or video settings, and/or other settings. If the control system determines that an identified user is currently sitting within a predetermined zone of the automobile, the control system may control one or more of these settings according to stored user preference setting data for the identified user.

In some implementations, a control system may be capable of detecting that an enrolled fingerprint has been altered. In some cases, the detected alteration may be the result of an injury to the digit corresponding to the enrolled fingerprint. The control system may respond to an indication that that an enrolled fingerprint has been altered in various ways, depending on the particular implementation. In some instances, the response may occur after pausing or ceasing a progressive enrollment process (such as one of the progressive enrollment processes described above) after the progressive enrollment process has reached a progressive enrollment threshold.

According to some examples, the control system may be configured for detecting changed fingerprint data for a previously-enrolled first fingerprint. The changed fingerprint data may have been received from the fingerprint sensor system. In some such examples, the control system may be configured for initiating a subsequent progressive enrollment process for the first digit. In some instances, the subsequent progressive enrollment process may be initiated after a pause or cessation of a progressive enrollment process for a first digit having a previously-enrolled first fingerprint. In some examples, the subsequent progressive enrollment process may be initiated only if at least one other previously-enrolled fingerprint is detected. According to some implementations, the subsequent progressive enrollment process may involve updating a fingerprint template for the first digit.

Figure 16:
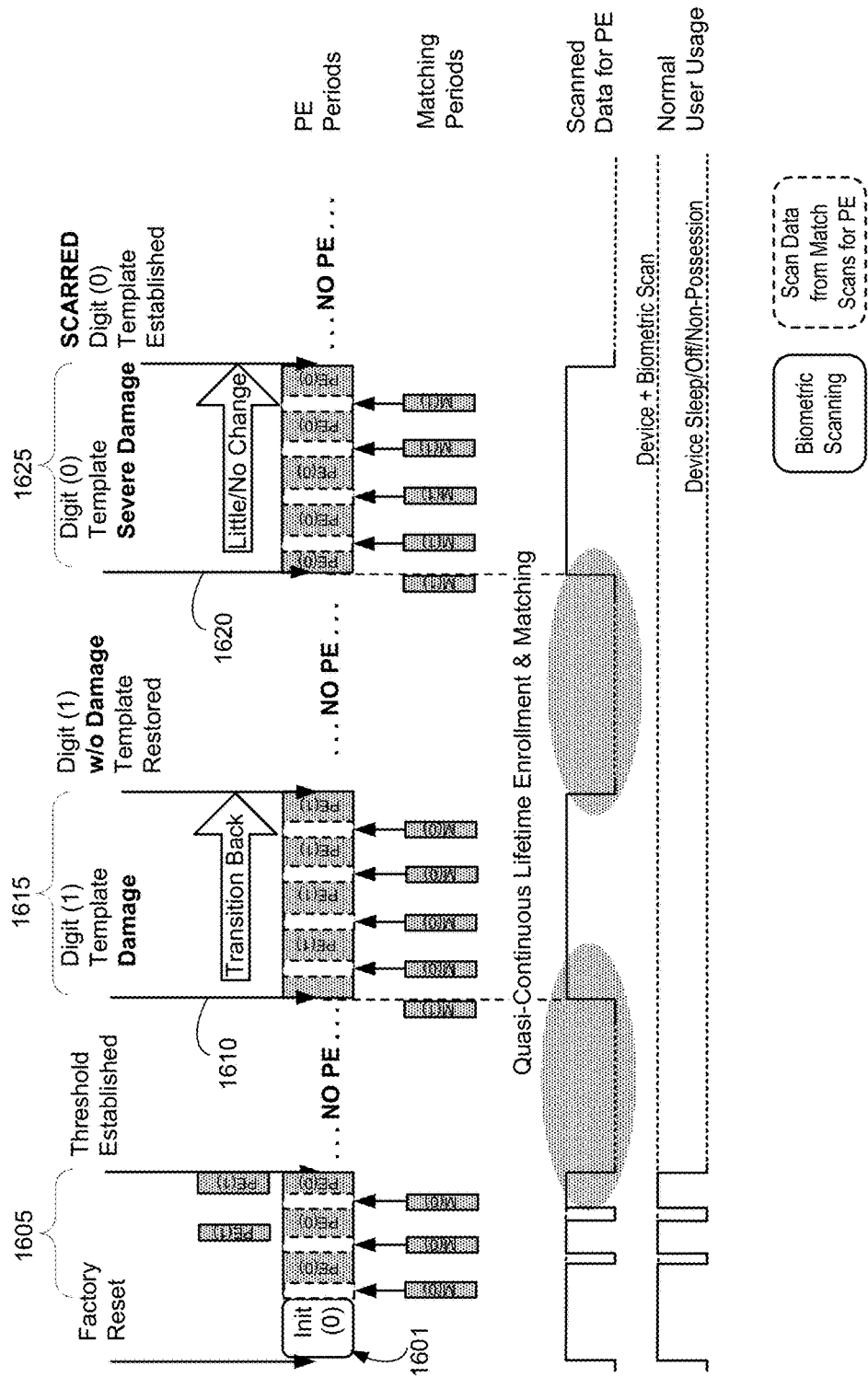
FIG. 16 shows examples of responding to an indication that that an enrolled fingerprint has been altered.

FIG. 16 shows examples of responding to an indication that that an enrolled fingerprint has been altered. The processes shown in FIG. 16 may, for example, be performed by a device that includes the apparatus 101 shown in FIG. 1. In FIG. 16, time proceeds from left to right. In this example, during an initial period 1601 of device usage, fingerprints from a user's digit 0 may be enrolled. In the example shown in FIG. 16, during the time interval 1605, between the initial period 1601 and a time at which a progressive enrollment threshold is established, a progressive enrollment process is performed for digit 0 and digit 1 (shown in FIG. 16 as PE(0) and PE(1), respectively) during each instance of device usage. In this example, after the progressive enrollment threshold is established, the progressive enrollment process for digit 0 and digit 1 is stopped, at least temporarily.

At the time indicated by arrow 1610, the control system determines that the fingerprint of digit 1 has been damaged. For example, the control system may determine, based on data received from a fingerprint sensor system, that at least some fingerprint minutiae of digit 1 are no longer present and/or that previously undetected fingerprint features have been detected for digit 1.

In the example shown in FIG. 16, during the time interval 1615, between the time indicated by arrow 1610 and a time at which a progressive enrollment threshold for digit 1 (PE(1)) has been re-established, a progressive enrollment process is performed for digit 1 during each instance of device usage. During the time interval 1615, the fingerprint of digit 0 is used for matching (M(0)) and authentication. In this instance, digit 1 heals during the time interval 1615 and, after the time interval 1615, the fingerprint template for digit 1 has regained some or all of the fingerprint minutiae that were no longer detectable after the injury. According to this example, after the progressive enrollment threshold for digit 1 has been re-established, the progressive enrollment process is stopped, at least temporarily.

At the time indicated by arrow 1620, the control system determines that the fingerprint of digit 0 has been damaged. For example, the control system may determine, based on data received from a fingerprint sensor system, that at least some fingerprint minutiae of digit 0 are no longer present.

According to the example shown in FIG. 16, during the time interval 1625, between the time indicated by arrow 1620 and a time at which a progressive enrollment threshold for digit 0 has been re-established, a progressive enrollment process is performed for digit 0 (PE(0)) during each instance of device usage. During the time interval 1625, the fingerprint of digit 1 is used for matching (M(1)) and authentication. In this example, digit 0 has been severely damaged and will never fully heal, but instead will have permanent scarring. Accordingly, although digit 0 heals during the time interval 1625, the fingerprint template for digit 0 has regained few or none of the fingerprint minutiae that were no longer detectable after the injury. Therefore, after the time interval 1625, the progressive enrollment process is stopped, at least temporarily. According to this example, during the time interval 1625, a new fingerprint template for digit 0 is established that includes fingerprint features corresponding to scar tissue on digit 0.

As noted above, according to some examples at least a portion of the fingerprint sensor system 102 may include an ultrasonic sensor system. The ultrasonic sensor system may, in some examples, include an array of ultrasonic transducer elements, such as an array of piezoelectric micromachined ultrasonic transducers (PMUTs), an array of capacitive micromachined ultrasonic transducers (CMUTs), etc. Other examples are described below with reference to FIGS. 17-18B.

Figure 17:
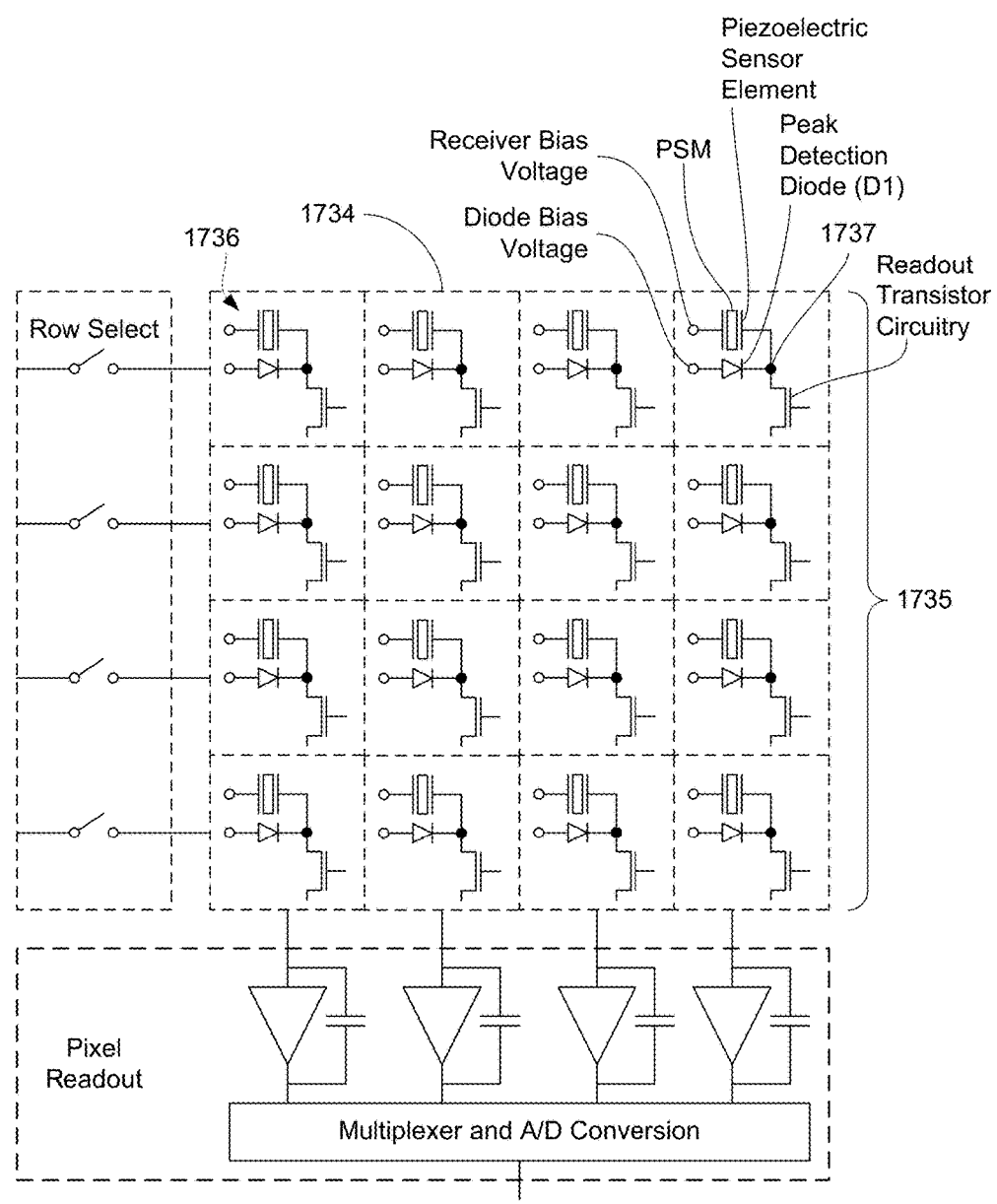
FIG. 17 representationally depicts aspects of a 4×4 pixel array of sensor pixels for an ultrasonic sensor system.

FIG. 17 representationally depicts aspects of a 4×4 pixel array of sensor pixels for an ultrasonic sensor system. Each pixel 1734 may be, for example, associated with a local region of piezoelectric sensor material (PSM), a peak detection diode (D1) and a readout transistor (M3); many or all of these elements may be formed on or in a substrate to form the pixel circuit 1736. In practice, the local region of piezoelectric sensor material of each pixel 1734 may transduce received ultrasonic energy into electrical charges. The peak detection diode D1 may register the maximum amount of charge detected by the local region of piezoelectric sensor material PSM. Each row of the pixel array 1735 may then be scanned, e.g., through a row select mechanism, a gate driver, or a shift register, and the readout transistor M3 for each column may be triggered to allow the magnitude of the peak charge for each pixel 1734 to be read by additional circuitry, e.g., a multiplexer and an A/D converter. The pixel circuit 1736 may include one or more TFTs to allow gating, addressing, and resetting of the pixel 1734.

Each pixel circuit 1736 may provide information about a small portion of the object detected by the ultrasonic sensor system. While, for convenience of illustration, the example shown in FIG. 17 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the target object.

Figure 18A:
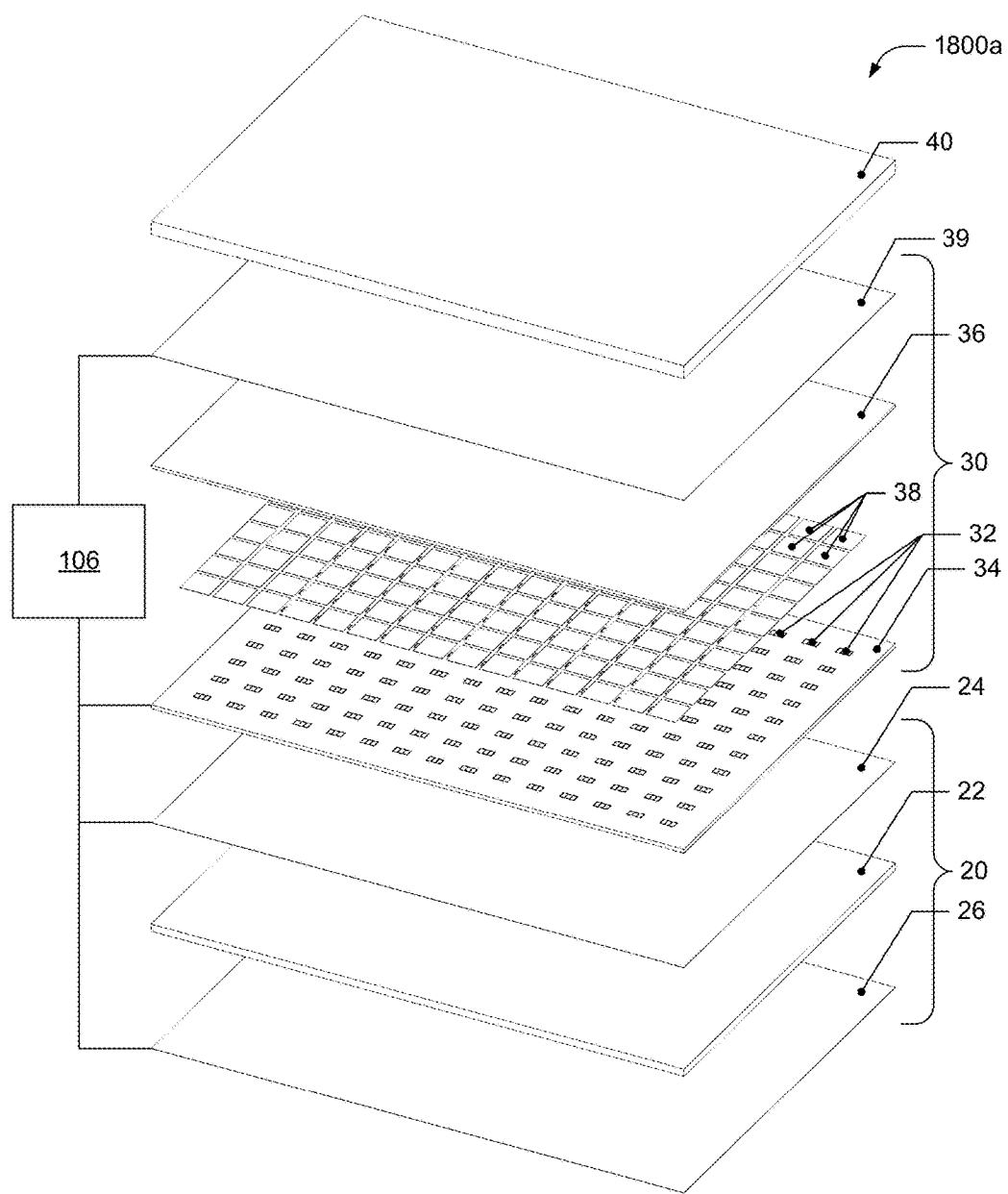
FIGS. 18A and 18B show example arrangements of ultrasonic transmitters and receivers in an ultrasonic sensor system, with other arrangements being possible.

FIG. 18A shows an example of an exploded view of an ultrasonic sensor system. In this example, the ultrasonic sensor system 1800a includes an ultrasonic transmitter 20 and an ultrasonic receiver 30 under a platen 40. According to some implementations, the ultrasonic receiver 30 may be an example of the ultrasonic receiver array 103 that is shown in FIG. 1 and described above. In some implementations, the ultrasonic transmitter 20 may be an example of the optional ultrasonic transmitter 105 that is shown in FIG. 1 and described above. The ultrasonic transmitter 20 may include a substantially planar piezoelectric transmitter layer 22 and may be capable of functioning as a plane wave generator. Ultrasonic waves may be generated by applying a voltage to the piezoelectric layer to expand or contract the layer, depending upon the signal applied, thereby generating a plane wave. In this example, the control system 106 may be capable of causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This ultrasonic wave may travel towards a finger (or other target object), passing through the platen 40. A portion of the wave not absorbed or transmitted by the object to be detected may be reflected so as to pass back through the platen 40 and be received by at least a portion of the ultrasonic receiver 30. The first and second transmitter electrodes 24 and 26 may be metallized electrodes, for example, metal layers that coat opposing sides of the piezoelectric transmitter layer 22.

The ultrasonic receiver 300 may include an array of sensor pixel circuits 32 disposed on a substrate 34, which also may be referred to as a backplane, and a piezoelectric receiver layer 36. In some implementations, each sensor pixel circuit 32 may include one or more TFT elements, electrical interconnect traces and, in some implementations, one or more additional circuit elements such as diodes, capacitors, and the like. Each sensor pixel circuit 32 may be configured to convert an electric charge generated in the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into localized electrical charges by the piezoelectric receiver layer 36. These localized charges may be collected by the pixel input electrodes 38 and passed on to the underlying sensor pixel circuits 32. The charges may be amplified or buffered by the sensor pixel circuits 32 and provided to the control system 106.

The control system 106 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 106 may operate substantially as described above. For example, the control system 106 may be capable of processing the amplified signals received from the sensor pixel circuits 32.

In some examples, the control system 106 may be capable of performing one or more of the spoof detection processes disclosed herein. The control system 106 may be capable of controlling the ultrasonic transmitter 20 and/or the ultrasonic receiver 30 to obtain ultrasonic data, e.g., by obtaining fingerprint images. Whether or not the ultrasonic sensor system 1800a includes an ultrasonic transmitter 20, the control system 106 may be capable of obtaining attribute information from the ultrasonic data. The attribute information may correspond to fingerprint features and/or to sub-epidermal features. In some examples, the control system 106 may be capable of performing one or more of the authentication processes disclosed herein. Accordingly, in some examples, the control system 106 may be capable of controlling access to one or more devices based, at least in part, on the attribute information.

The ultrasonic sensor system 1800*a* (or an associated device) may include a memory system that includes one or more memory devices. In some implementations, the control system 106 may include at least a portion of the memory system. The control system 106 may be capable of obtaining attribute information from ultrasonic image data and storing the attribute information in the memory system. In some implementations, the control system 106 may be capable of capturing a fingerprint image, obtaining attribute information from the fingerprint image and storing attribute information obtained from the fingerprint image (which may be referred to herein as fingerprint image information) in the memory system. According to some examples, the control system 106 may be capable of capturing a fingerprint image, obtaining attribute information from the fingerprint image and storing attribute information obtained from the fingerprint image even while maintaining the ultrasonic transmitter 20 in an "off" state.

In some implementations, the control system 106 may be capable of operating the ultrasonic sensor system 1800*a* in an ultrasonic imaging mode or a force-sensing mode. In some implementations, the control system may be capable of maintaining the ultrasonic transmitter 20 in an "off" state when operating the ultrasonic sensor system in a force-sensing mode. The ultrasonic receiver 30 may be capable of functioning as a force sensor when the ultrasonic sensor system 1800*a* is operating in the force-sensing mode. In some implementations, the control system 106 may be capable of controlling other devices, such as a display system, a communication system, etc. In some implementations, the control system 106 may be capable of operating the ultrasonic sensor system 1800*a* in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is capable of imaging fingerprints in a force detection mode or a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 μm thick and a PVDF-TrFE receiver layer 36 is approximately 12 μm thick. Example frequencies of the ultrasonic waves may be in the range of 5 MHz to 30 MHz, with wavelengths on the order of a millimeter or less.

Figure 18B:
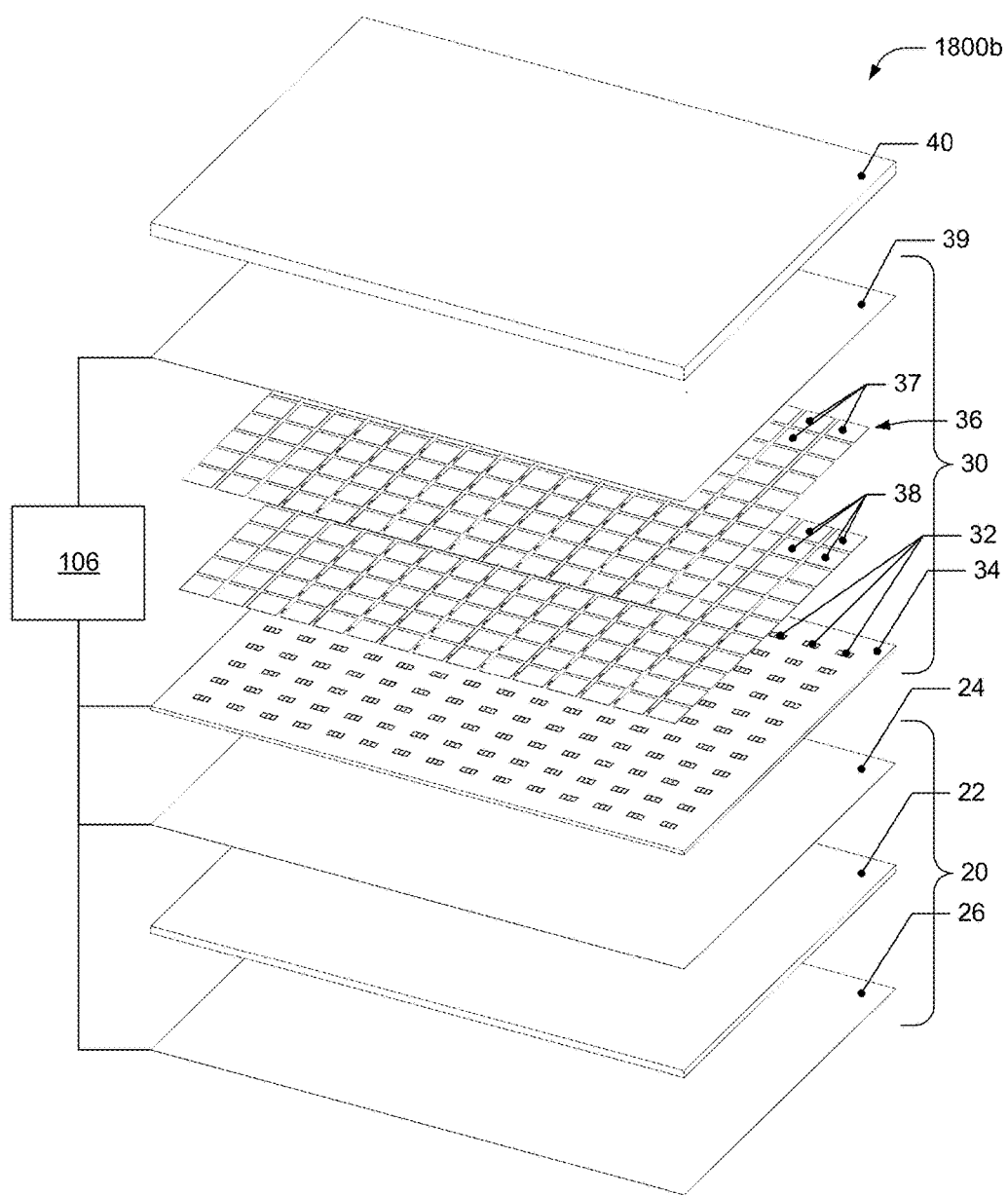

FIG. 18B shows an exploded view of an alternative example of an ultrasonic sensor system. In this example, the piezoelectric receiver layer 36 has been formed into discrete elements 37. In the implementation shown in FIG. 18B, each of the discrete elements 37 corresponds with a single pixel input electrode 38 and a single sensor pixel circuit 32. However, in alternative implementations of the ultrasonic sensor system 1800*b*, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 18A and 18B show example arrangements of ultrasonic transmitters and receivers in an ultrasonic sensor system, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor array (e.g., a single-layer transmitter and receiver). In some implementations, the ultrasonic sensor system may include an acoustic delay layer. For example, an acoustic delay layer may be incorporated into the ultrasonic sensor system between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic sensor system is arriving at the ultrasonic receiver 30. In some implementations, the substrate 34 and/or the platen 40 may serve as an acoustic delay layer.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus, comprising:
   a fingerprint sensor system; and
   a control system configured for communication with the fingerprint sensor system, the control system further configured for:
      receiving fingerprint sensor data from the fingerprint sensor system;
      extracting fingerprint data from the fingerprint sensor data, the fingerprint data corresponding to fingerprints of multiple digits of a user's hand; and
      providing a progressive enrollment process for the fingerprint data, the progressive enrollment process including:
         storing at least some of the fingerprint data; and
         augmenting stored fingerprint data as the user continues to use the apparatus, wherein the progressive enrollment process involves processing first fingerprint data corresponding to a first digit of the user's hand during a processing time for second fingerprint data corresponding to a second digit of the user's hand.

2. The apparatus of claim 1, wherein the control system is configured for performing at least a portion of the progressive enrollment process without causing the apparatus to provide user prompts.

3. The apparatus of claim 2, wherein the portion is an initial portion of the progressive enrollment process, prior to which no fingerprint data for the user has been enrolled.

4. The apparatus of claim 2, wherein the portion is a portion of the progressive enrollment process that is performed after enrolling fingerprint data corresponding to at least one digit of the user's hand.

5. The apparatus of claim 1, wherein fingerprint sensors of the fingerprint sensor system are distributed around at least part of a perimeter of the apparatus.

6. The apparatus of claim 1, wherein the control system is further configured for enrolling multiple authorized users and creating multiple authorized user accounts, each of the authorized user accounts including data for multiple fingerprints.

7. The apparatus of claim 1, wherein the control system is further configured for automatically making the apparatus transition from a state in which an authorized user is logged out to a state in which the authorized user is logged in, in response to a first contact of the authorized user's digits, without causing the apparatus to provide user prompts.

8. The apparatus of claim 7, wherein the apparatus includes a display and wherein making the transition to the state in which the authorized user is logged in involves at least one of loading an authorized user's desktop configuration and controlling the display to present the authorized user's desktop configuration, loading an authorized user's last application or loading an authorized user's last window viewed and controlling the display to present the authorized user's last window viewed.

9. The apparatus of claim 1, wherein the control system is further configured for:
    determining that fingerprint data currently being acquired by the fingerprint sensor system corresponds with fingerprints of a first authorized user and fingerprints of a second authorized user; and
    invoking account characteristics of the second authorized user without logging out the first authorized user.

10. The apparatus of claim 1, wherein the control system is further configured for:
    detecting a first digit in contact with the apparatus, the first digit having a previously-enrolled first fingerprint;
    detecting, while the first digit is in contact with the apparatus, a second digit having a second fingerprint that has not previously been enrolled; and
    performing an enrollment process for the second digit without causing the apparatus to provide a user prompt.

11. An apparatus, comprising:
    a fingerprint sensor system; and
    a control system configured for communication with the fingerprint sensor system, the control system further configured for:
        receiving fingerprint sensor data from the fingerprint sensor system;
        extracting fingerprint data from the fingerprint sensor data, the fingerprint data corresponding to fingerprints of multiple digits of a user's hand; and
        providing a progressive enrollment process for the fingerprint data, the progressive enrollment process including:
            storing at least some of the fingerprint data; and
            augmenting stored fingerprint data as the user continues to use the apparatus, wherein the control system is configured for performing at least a portion of the progressive enrollment process without causing the apparatus to provide user prompts and wherein the augmenting comprises augmenting the stored fingerprint data corresponding to more than one digit of the user's hand.

12. The apparatus of claim 11, wherein the portion is an initial portion of the progressive enrollment process, prior to which no fingerprint data for the user has been enrolled.

13. The apparatus of claim 11, wherein the portion is a portion of the progressive enrollment process that is performed after enrolling fingerprint data corresponding to at least one digit of the user's hand.

14. The apparatus of claim 11, wherein the control system is further configured for increasing a matching threshold after the progressive enrollment process has reached a progressive enrollment threshold.

15. The apparatus of claim 11, wherein the control system is further configured for pausing or ceasing the progressive enrollment process after the progressive enrollment process has reached a progressive enrollment threshold.

16. The apparatus of claim 11, wherein the control system is further configured for:
    detecting a first digit in contact with the apparatus, the first digit having a previously-enrolled first fingerprint;
    detecting, while the first digit is in contact with the apparatus, a second digit having a second fingerprint that has not previously been enrolled; and
    performing an enrollment process for the second digit without causing the apparatus to provide a user prompt.

17. The apparatus of claim 16, wherein the control system is further configured for:
    detecting changed fingerprint data for the previously-enrolled first fingerprint, the changed fingerprint data having been received from the fingerprint sensor system; and
    initiating a subsequent progressive enrollment process for the first digit.

18. The apparatus of claim 17, wherein the subsequent progressive enrollment process is initiated after a pause or cessation of a progressive enrollment process for a first digit having a previously-enrolled first fingerprint.

19. The apparatus of claim 17, wherein the subsequent progressive enrollment process is initiated only if at least one other previously-enrolled fingerprint is detected.

20. The apparatus of claim 17, wherein the subsequent progressive enrollment process involves updating a fingerprint template for the first digit.

21. The apparatus of claim 11, wherein the progressive enrollment process involves processing fingerprint data corresponding to a first digit of the user's hand during a processing time for fingerprint data corresponding to a second digit of the user's hand.

22. The apparatus of claim 11, wherein fingerprint sensors of the fingerprint sensor system are distributed around at least part of a perimeter of the apparatus.

* * * * *